(12) United States Patent
Hadad

(10) Patent No.: US 8,165,010 B2
(45) Date of Patent: Apr. 24, 2012

(54) OFDMA PREAMBLES SYSTEM AND METHOD

(75) Inventor: Zion Hadad, Rishon Lezion (IL)

(73) Assignee: Runcom Technologies, Ltd., Holon (IL)

( * ) Notice: Subject to any disclaimer, the term of this patent is extended or adjusted under 35 U.S.C. 154(b) by 291 days.

(21) Appl. No.: 12/279,646

(22) PCT Filed: Jun. 28, 2005

(86) PCT No.: PCT/IL2005/000684
§ 371 (c)(1),
(2), (4) Date: Aug. 15, 2008

(87) PCT Pub. No.: WO2006/001019
PCT Pub. Date: Jan. 5, 2006

(65) Prior Publication Data
US 2009/0303865 A1 Dec. 10, 2009

Related U.S. Application Data

(60) Provisional application No. 60/582,820, filed on Jun. 28, 2004, provisional application No. 60/605,497, filed on Aug. 31, 2004.

(51) Int. Cl.
*H04J 11/00* (2006.01)
*H04B 1/00* (2006.01)
(52) U.S. Cl. .................. 370/208; 370/210; 375/137
(58) Field of Classification Search .............. None
See application file for complete search history.

(56) References Cited

U.S. PATENT DOCUMENTS

| | | | |
|---|---|---|---|
| 2004/0162097 A1* | 8/2004 | Vijayan et al. | 455/522 |
| 2005/0036481 A1* | 2/2005 | Chayat et al. | 370/351 |
| 2005/0286547 A1* | 12/2005 | Baum et al. | 370/437 |
| 2006/0050799 A1* | 3/2006 | Hou et al. | 375/260 |
| 2006/0140296 A1* | 6/2006 | Cleveland et al. | 375/260 |
| 2006/0203932 A1* | 9/2006 | Palanki et al. | 375/295 |
| 2007/0217546 A1* | 9/2007 | Sandell et al. | 375/299 |
| 2008/0039107 A1* | 2/2008 | Ma et al. | 455/450 |
| 2009/0040975 A1* | 2/2009 | Vijayan et al. | 370/329 |

* cited by examiner

*Primary Examiner* — Andrew Lee
(74) *Attorney, Agent, or Firm* — Robert G. Lev; Jeremy Ben-David

(57) ABSTRACT

A preamble code usable in Orthogonal Frequency Division Multiple Access (OFDMA) for the physical layer (PHY), selected for improved PAPR in a 1024, 512 or 128 FFT OFDMA mode. Tables 2 to 7 detail code sequences having improved PAPR performance. The disclosed codes may be used in cellular wireless.

9 Claims, 5 Drawing Sheets

OFDMA PREAMBLES SYSTEM AND METHOD

This application is filed under 35 USC 371 and is based on, and claims the benefit of, International Application having a serial number of PCT/IL2005/000684, which was filed on Jun. 28, 2005 and claiming priority to U.S. Provisional Application for Patent filed on Jun. 28, 2004 with a title of "PREAMBLES DESIGN FOR OFDMA PHY LAYER, FFT SIZES OF 1024, 512, and 128" and assigned Ser. No. 60/582, 820 and U.S. Provisional Application for Patent filed on Aug. 31, 2004 with a title of "PREAMBLES DESIGN FOR OFDMA PHY LAYER, FFT SIZES OF 1024, 512, and 128" and assigned Ser. No. 60/605,497, all of which are incorporated herein by reference.

TECHNICAL FIELD

This invention relates to improvements in codes used in wireless communications, and more specifically to preamble codes.

BACKGROUND ART

The invention relates to improvements in preamble codes used in Orthogonal Frequency Division Multiple Access (OFDMA) for the physical layer (PHY).

The invention may be used, for example, to improve the communication performance in systems within the IEEE 802.16 Standard for Broadband Wireless Access. Such improvements may better adapt the OFDMA to a mobile environment.

The improvements may be used in the OFDMA PHY/MAC layers.

An important parameter in such communications is the Peak to Average Power Ratio (PAPR). Wideband signals may exhibit high values of PAPR, which pose high demands on the linearity performance of the system. That is, a large dynamic range is required to convey the high amplitude peaks associated with such signals.

It may be highly desirable to reduce the PAPR, to allow improved performance while concurrently reducing the costs of communication systems.

It is important to achieve improved performance in short codes, of length 128, 512 and 1K, in the preamble.

The communications may use various Fast Fourier Transform (FFT) values, thus improvements preferably should be capable at operating at these values.

DISCLOSURE OF INVENTION

This invention describes improved preamble codes having a lower PAPR value. For example, the preambles used in the 2K OFDMA mode were devised so as to have a lower PAPR, this having many advantages. For example, a lower PAPR allows to boost the preamble to get better performance in the estimation/acquisition/cell monitoring, etc.

The present disclosure includes improvements in the 1024, 512 and 128 FFT OFDMA modes.

Tables with series to modulate, for different FFT sizes, are disclosed in the present application.

MODES FOR CARRYING OUT THE INVENTION

Figure 1:
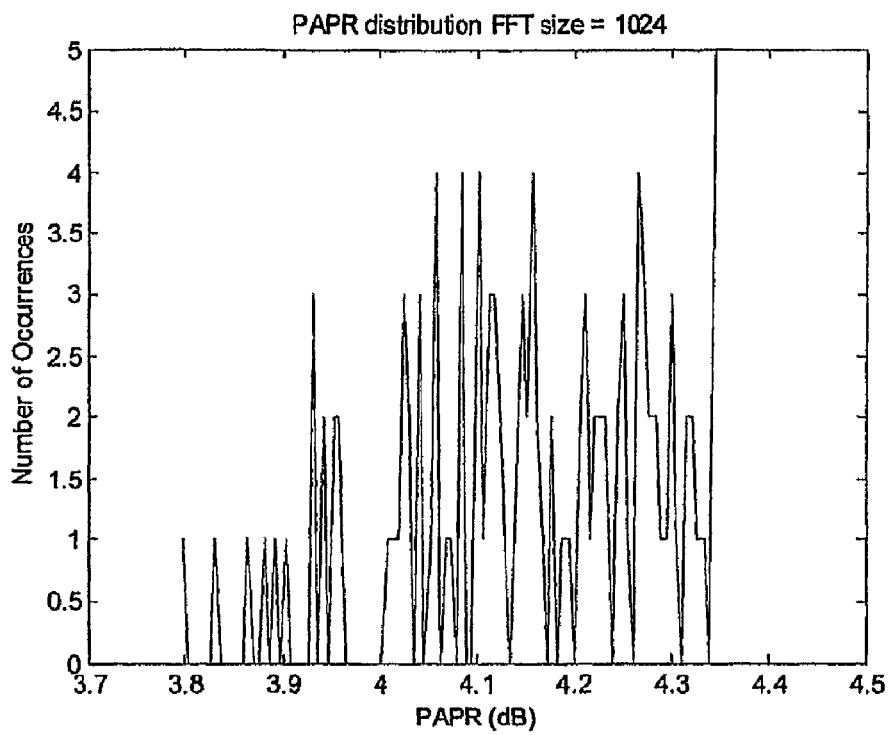
FIG. 1 illustrates the PAPR distribution for FFT size 1024
Figure 2:
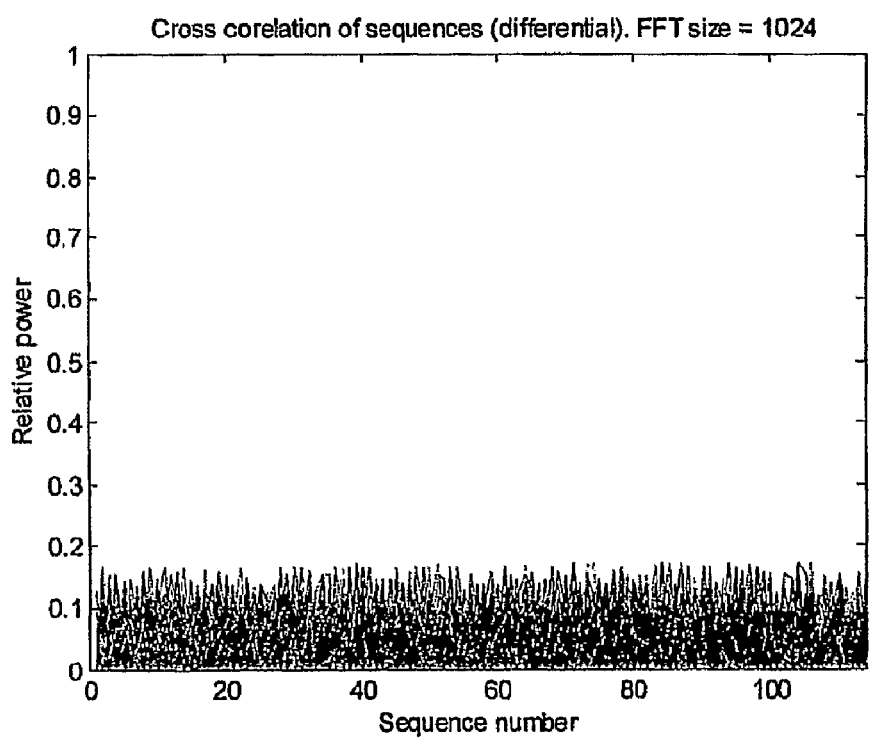
FIG. 2 illustrates the Cross-correlation for FFT size 1024
Figure 3:
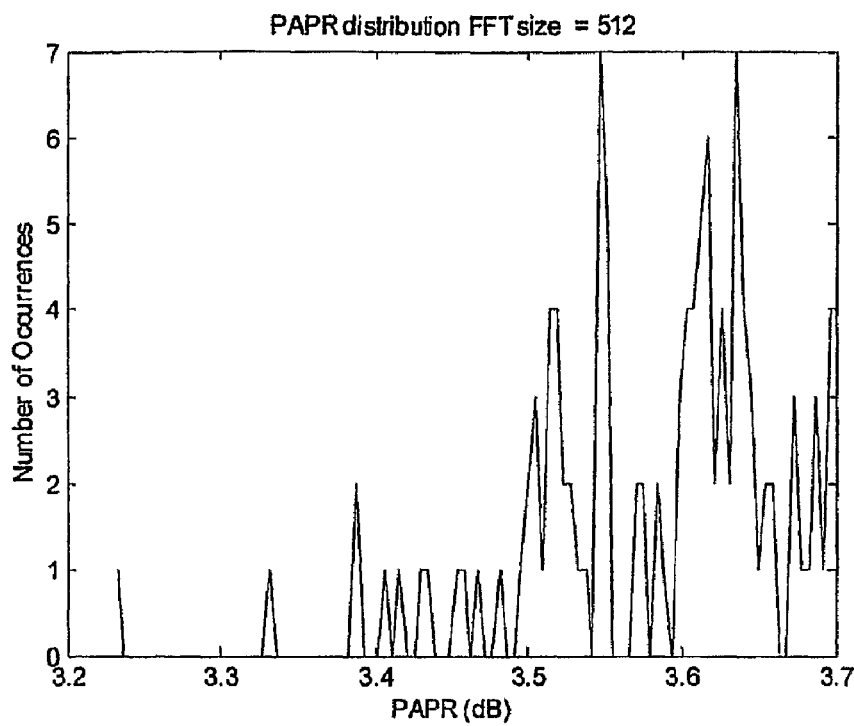
FIG. 3 illustrates the PAPR distribution for FFT size 512
Figure 4:
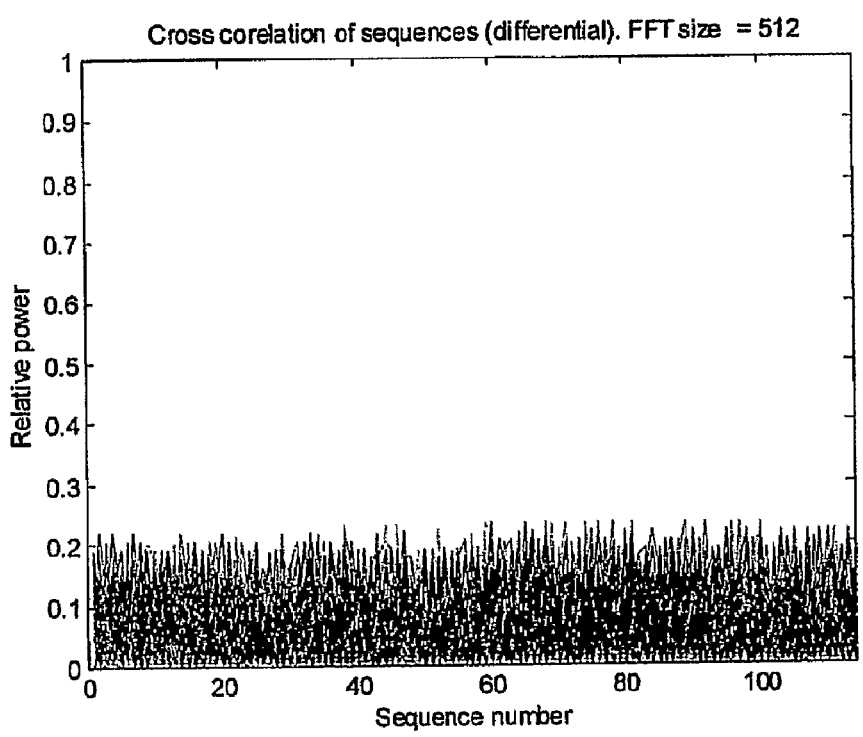
FIG. 4 illustrates the Cross-correlation for FFT size 512
Figure 5:
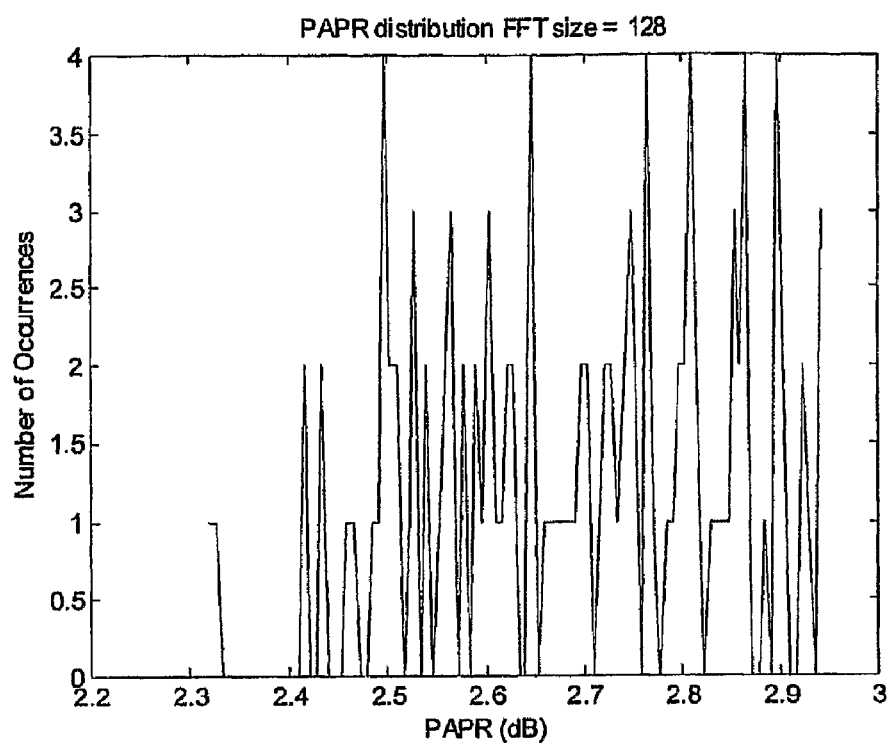
FIG. 5 illustrates the PAPR distribution for FFT size 128
Figure 6:
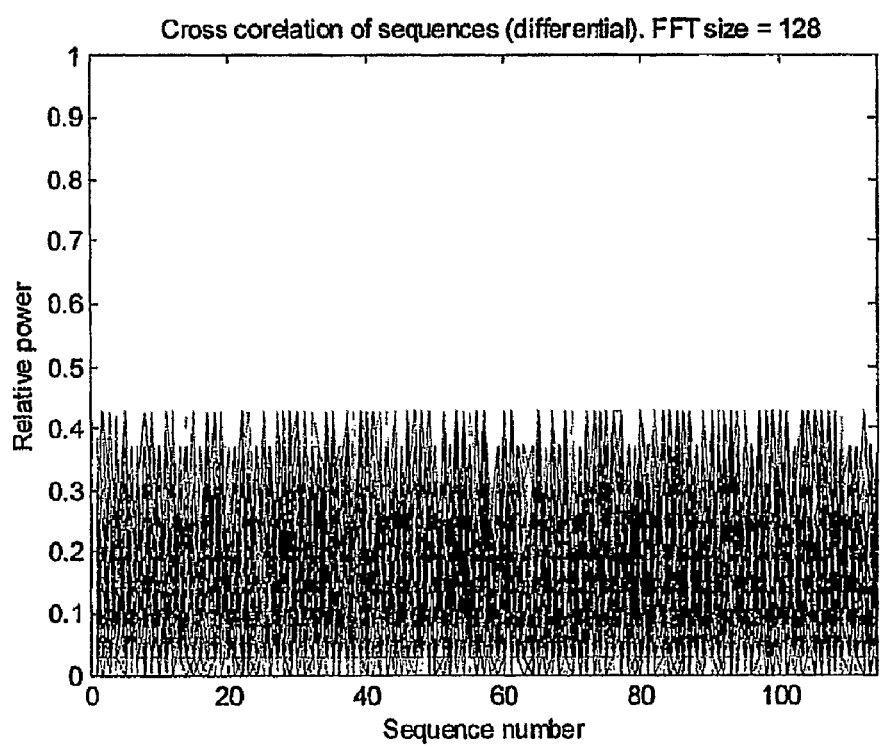
FIG. 6 illustrates the Cross-correlation for FFT size 128
FIG. 7 details a first wireless cell surrounded by a first tier and a second tier of cells.

The present disclosure includes, by way of example, improvements in the 1024, 512 and 128 FFT OFDMA modes.

Tables with series to modulate, for different FFT sizes, are disclosed in the present application.

The following tables detail Pseudo Noise (PN) sequences that may be used to modulate the pilot carriers in the preamble signal. Pilot carriers are modulated every third carrier.

Table 1 describes the parameters used for each FFT size.

The series length is determined by mapping the carriers up to the last allowed carrier, then truncated if the series is too long.

The following tables illustrate series required for different FFT sizes.

The PN series are shown in hexadecimal format, wherein each digit represents values from 0 to 15 decimal (0, 1, 2, 3 . . . 9, A, B, C, D, E, F), thus each digit may represent four bits of code.

Where required, the binary series may be lengthened by padding with zeros at the end of a sequence so the number of bits is a multiple of 4 (each hexa digit represents 4 bits) or a multiple of 8 (each byte represents 8 bits). The series may be then converted to hexa from the MSB to LSB.

Table 2 illustrates a preambles modulation series per segment and Cellid, for the 1K FFT mode.

Suggested title: Table 307b, if included in the IEEE Standard.

Table 3 illustrates a preambles modulation series per segment and Cellid, for the 512 FFT mode.

Suggested title: Table 307c, if included in the IEEE Standard.

Table 4 illustrates a preambles modulation series per segment and Cellid, for the 128 FFT mode.

Suggested title: Table 307d, if included in the IEEE Standard.

As disclosed in the U.S. provisional application No. 60/605,497 filed on 31 Aug. 2004 by the present applicant, the present invention may also be included as an improvement in the IEEE Standard P802.18e/D3 change, by adding on page 79 the paragraph in page 556 IEEE802.16d-2004 to read:

The PN series modulating the pilots are defined in Tables 307a-307d. The series modulated depends on the segment used and IDcell parameter. The defined series shall be mapped onto the preamble subcarriers in ascending order. Tables 307a-307d include the PN sequence in Hexadecimal format. The value of the PN may be obtained by converting the series to a binary series (Wk) and starting mapping the PN from the MSB of each symbol to the LSB. Thus, for example, 0 may be mapped to +1 and 1 to −1.

For example, in Table 307a for the 2K mode Index=0, segment=0, Wk=110000010010 . . . and the mapping may be: −1, −1, +1, +1, +1, +1, +1, −1, +1, +1, −1, +1 . . .

Table 5 illustrates another embodiment of a preambles modulation series per segment and Cellid, for the 1K FFT mode.

Suggested title: Table 307b, if included in the IEEE Standard.

TABLE 1

The parameters used for each FFT size

| Parameter | 1024 FFT | 512 FFT | 128 FFT |
|---|---|---|---|
| Starting pilot carrier | 87 + Segment | 44 + Segment | 87 + Segment |
| Carrier increment for next pilot | 3 | 3 | 3 |
| Number of carriers used for the preamble * | 284/283 | 142 | 36/35 |
| Last carrier allowed to be modulated | 850 | 425 | 105 |

TABLE 2

Preambles modulation series for the 1K FFT mode

| Number | CellId | Segment | Series to modulate (in Hexadecimal format) |
|---|---|---|---|
| 0 | 0 | 0 | A6F294537B285E1844677D133E4D53CCB1F182DE00489E53E6B6E77065C7EE7D0ADBEAF |
| 1 | 1 | 0 | 668321CBBE7F462E6C2A07E8BBDA2C7F7946D5F69E35AC8ACF7D64AB4A33C467001F3B2 |
| 2 | 2 | 0 | 1C75D30B2DF72CEC9117A0BD8EAF8E0502461FC07456AC906ADE03E9B5AB5E1D3F98C6E |
| 3 | 3 | 0 | 5F9A2E5CA7CC69A5227104FB1CC2262809F3B10D0542B9BDFDA4A73A7046096DF0E8D3D |
| 4 | 4 | 0 | 82F8A0AB918138D84BB86224F6C342D81BC8BFE791CA9EB54096159D672E91C6E13032F |
| 5 | 5 | 0 | EE27E59B84CCF15BB1565EF90D478CD2C49EE8A70DE368EED7C9420B0C6FFAF9AF035FC |
| 6 | 6 | 0 | C1DF5AE28D1CA6A8917BCDAF4E73BD93F931C44F93C3F12F0132FB643EFD5885C8B2BCB |
| 7 | 7 | 0 | FCA36CCCF7F3E0602696DF745A68DB948C57DFA9575BEA1F05725C42155898F0A63A248 |
| 8 | 8 | 0 | 024B0718DE6474473A08C8B151AED124798F15D1FFCCD0DE574C5D2C52A42EEF858DBA5 |
| 9 | 9 | 0 | D4EBFCC3F5A0332BEA5B309ACB04685B8D1BB4CB49F9251461B4ABA255897148F0FF238 |
| 10 | 10 | 0 | EEA213F429EB926D1BDEC03ABB67D1DE47B4738F3E929854F83D18B216095E6F546DADE |
| 11 | 11 | 0 | C03036FA9F253045DF6C0889A8B83BAEFCF90EB993C2D79BD911CA84075061AA43DA471 |
| 12 | 12 | 0 | 1E68EC22E5E2947FB0A29E4CC70597254B36C60331EACF779FE752D3F55DC41ABFC7DC9 |
| 13 | 13 | 0 | 63A57E75A0434F035AAC4504B265081D497F10C77928B71797C5D6C6824DC0F23BE34EE |
| 14 | 14 | 0 | C57C4612816DE981C58FD6F8DE9DD41F2422ADBC522B0CE31F9A6D5F2A126DC08F69FB1 |
| 15 | 15 | 0 | 978256AF184E7ED17789B33D324C711B36BFBCCE5446EB03687E9A0A839C7CE156104D2 |
| 16 | 16 | 0 | 011EC823157DD73150640CEB7DDB0A1F8F91E09599A851D5C7CAF687CFB752D297D82FC |
| 17 | 17 | 0 | C6DE82BEB7F57B9120E8A376D85C8F70FDC65BC660402DAC4AE6002EA2740C4F9E5973C |
| 18 | 18 | 0 | 4C74929D6F9FAB9E5BB761026038E076F6824295E0AF397806ECEBC6DC713F03ACDC27C |
| 19 | 19 | 0 | 596F18F3D454D581BBC0A414F43B595E270AD5E5AA3D4CE6BF4860093EA13B271934344 |
| 20 | 20 | 0 | 13E1E85C2234D0F3418001A35F135E10C6C918C36BC659FDA9D655D288A0BDAA8BF489D |
| 21 | 21 | 0 | FD4AF2D8F4F08F1A7DF59291C9AEE788F641B8231CFB813376E0BEB68DFCFCBBE552445 |
| 22 | 22 | 0 | 315E59049D478B0ADB32740B583DFE465F76B1F2021D0F5829B34A09EB1D85E0531082E |
| 23 | 23 | 0 | EBBC77A493AA0C62C62F25EE5E8D0701F50386F49026FA31487C9FD5C5206CE4EB00576 |
| 24 | 24 | 0 | 134F936F9E875842587ADCA92187F2FC6D62FFC3A833D8CDE465F9972ABAA83763AAEB7 |
| 25 | 25 | 0 | 3CD1DA70670BC73363D1B4A66D280FF6AA7636D07ECF32BA26101E5EBA1594FB8A0420A |
| 26 | 26 | 0 | 918296B2937C2B6F73CF98F85A81B723D1C69DBDF3E019749C582DA22E789562729D475 |
| 27 | 27 | 0 | C323981B8B2240865F48D61AE1B3B61D88522B7358952F949D4308CA15D1EE8FDFA683F |
| 28 | 28 | 0 | 7514A6FA5FBB250C5C8CE96F791D676036C344A44B24284477B44CB3E758F8BCD58F05B |
| 29 | 29 | 0 | 84C7FEC6E977FA1EC0C7CC9E0D067C73D8F846F82ABB3456D2104E1448D5A58D5975152 |
| 30 | 30 | 0 | A0028A7F873AF31DFF45970F51E477346CF8EDD9EFE07694DCCDD6DAEC32694A1176D68 |

TABLE 2-continued

Preambles modulation series for the 1K FFT mode

| Number | CellId | Segment | Series to modulate (in Hexadecimal format) |
|---|---|---|---|
| 31 | 31 | 0 | 4841AFC277B86A0E067AF319422F501C87ACBFBDD66BFEA3644F879AE98BA8C5D605123 |
| 32 | 0 | 1 | F35EA87318E459138A2CE69169AD5FD9F30B62DA04ED21320A9F59893F0D176752152FD |
| 33 | 1 | 1 | A0C5F35C5971CD3DC55D7D2B9FD27AA17A198583F580EB0800744EE5B6B3648DEA95840 |
| 34 | 2 | 1 | A6D3D33AD9B56862DBF076E3ACE6A3150510CCC8BE77DE4E6E10EB5FE163765647D07DF |
| 35 | 3 | 1 | F335D714EDB2251A374746686EBBB485AF9A13C0F45324AE7D73A8C2016FE1A7C24A052 |
| 36 | 4 | 1 | 3B841526CCF9D4E1BB79E45E83F69A523A006B02BFCAC95594F4DDCB95705ADEBCF365F |
| 37 | 5 | 1 | 52849D8F020EA6583032917F36E8B62DFD18AD4D77A7D2D8EC2D4F20CC0C75B7D4DF708 |
| 38 | 6 | 1 | 8E353EC8162F5BB6947F1843C84FE4114616B8CAA45BE4BF718899D818B5B4074FCDB4F |
| 39 | 7 | 1 | CC53A152209DEC7E61A06195E3FA633076F7AE1BAFFE83CE565087C0507BA596E0BD990 |
| 40 | 8 | 1 | 17D98A7E32CCA9B142FE32DB37B2BF726E25AA7A557FFB5C400B47A38B16CF18E1EDE63 |
| 41 | 9 | 1 | 5B0B7631EFE3FFE1B558E7619DB8DD71D40E6CD6E4D5517C8FACD20B6A9B85CCBC340CB |
| 42 | 10 | 1 | 2B08F06EEB736C84585AAC5BF912A249BD2109F841F44168E0D2971841976D0E28FCDEB |
| 43 | 11 | 1 | D3AA20EF175DF3BD96D638D6797A8AA4DE51A910446465736E4D7953C8D50AD3D7A0096 |
| 44 | 12 | 1 | A5BA8C7E2C795C9F84EBBD425992766BDE5549A7A9F7EF7E44AFD941C6084568638FE84 |
| 45 | 13 | 1 | 33E57E78A5696255CA61AE36027036DA619E493A0A8F95D9915C6E61F3006CB9706BEBA |
| 46 | 14 | 1 | 09961E7309A9B7F3929C370C51910EBAB1B4F409FA976AE8679F354C84C4051F371F902 |
| 47 | 15 | 1 | 508A9EBAEF3C7E09CFCFC0B6F444A09B45A130EFC8C5B22BCE87213854E7C9D329C9ADC |
| 48 | 16 | 1 | FBCD16253DF81FDC86F726AAAF4F33EE771489281A64184F3A929BD230A2D6AE4EC9E1C |
| 49 | 17 | 1 | AACEEF9BCDC82E4AD525185B07CBABCB74861D16F7C25CFBA917B05463AD65391AF840D |
| 50 | 18 | 1 | 23060ACC5A125DAB207EEEE47B4EEE1E8466BD17DDA2EB3CD90D2AB7A758C213E6D7FE5 |
| 51 | 19 | 1 | CA55521667BDA8B6F1B205201A51B3A0C05DE9EA06BC73268730A81A992777021F46055 |
| 52 | 20 | 1 | 05ADFCA2F8207DC6FF8D1A85A1DD4694D4C48A838C4F833C532710021AC448A7B62B8DD |
| 53 | 21 | 1 | EDB5D94052CF0D9A573078FB0EEDAB142ECA77547E04E91C6A0037B2110924BCAD8F359 |
| 54 | 22 | 1 | 218C951223D7B712DC98F8B5217388A830003C5F2A00F232DD3475D2FC78C25B8D88FF9 |
| 55 | 23 | 1 | 79B94D24D721121EF678B7156F8D2666DE712BBF3837C85A95187819031 46A7B4D42A28 |
| 56 | 24 | 1 | 58AABEF6A6BDE4011CAC583C5104B2C6FC5A2980F856373E5931A3C690245327581FA13 |
| 57 | 25 | 1 | 429492DBCFE43A1B8C8037433003543CA2CF03035D13BA70BD773C6117D92E1B0446C9D |
| 58 | 26 | 1 | 427D1AD18E338E16FCE6E23B4AD6D82A2144D53048F2665AA94577AFABD26889FCB1F9F |
| 59 | 27 | 1 | 337FE0E4C15A22471AE0F6B6F91161A7DE2E1403D73587D5C8355105D2F70642B2CE425 |
| 60 | 28 | 1 | CC78DB7CAE28F42C00E9C857082C7BFA276386FDE905373D1E99DFC52D7C23520BECE2D |
| 61 | 29 | 1 | 499FDB04EACA4BF7C9D956DC26E57A9AC636861AE9557F39792D1D70D0034067A9F4E73 |
| 62 | 30 | 1 | A3FCAA311B536AC9DB39FED9F4E996506B3181C58D6B7E04157A3FD463F60468765BCFD |
| 63 | 31 | 1 | F484FD1F57F53A4A749B86148E0B1D0653667CE1393198875DDB0AE9179BBBDAAD53A11 |
| 64 | 0 | 2 | 29F529BD5762F27ACD3A0836AC6C8953951C04C67B92F05919F382C811D4C0EF9C01488 |
| 65 | 1 | 2 | A3E9ECF1E6048562BC89DB6168E708855F0D4AD29F859EF36C9160DF407D85426233632 |
| 66 | 2 | 2 | 890519376D1FFAA2894EABCD6663B0A3C2411982C17B01270E0FB0B289D4BC8C3B83DA9 |
| 67 | 3 | 2 | 54FD243CC4DAA9B8E4D47F2DE45605D6EF2C17259CD10EF9EBC7B92F7F7299129080C75 |
| 68 | 4 | 2 | BAC53AA6F0291E10E2CE9B52D22B682637B1F5501531B7F1EE6A649E2404196A028ED10 |

TABLE 2-continued

Preambles modulation series for the 1K FFT mode

| Number | CellId | Segment | Series to modulate (in Hexadecimal format) |
|---|---|---|---|
| 69 | 5 | 2 | 2C41D56E693B529AFC883E79ABE6B829201F132E6261A0 1973B4225CEE7116CEDADB2F2 |
| 70 | 6 | 2 | 09847B6187BB5F6F6728B4ED610088FAD9DADFC00748E 9DCD8A0CE320D6C991654ABE05 |
| 71 | 7 | 2 | 91425CEE8F1DFD79EF572F9C66CB60BD4757E0519F1336 84B5A2F4E3E266532584DBEEE |
| 72 | 8 | 2 | 3285AE0A3D196313659C37BE1C94D61D20F11FD49D9FD F9D1026FF5763F02CB78AE135C |
| 73 | 9 | 2 | 0069D3F34D0D455AFB45FEFDF716333B785C6BDA90DA 23F1CC68BC6A1DBC916C595DA3E |
| 74 | 10 | 2 | AA977A8BCA39381E7C35A1ACC7C4F60421C0862BFD61 06C7C025B0676EA0EF68972DD8F |
| 75 | 11 | 2 | F310745C497094ABE56E0490C0800319DBE290553E696B6 859635AF03B121F79D925D19 |
| 76 | 12 | 2 | 964DFD350B9C7DFDC7F6F7C43283A76F0D613E48A5520 D1DAF761C6F47E389B43A023F5 |
| 77 | 13 | 2 | 8102E980BC69C2C3BE45452169DCA6C45C21B2A6DF69B 12731FEF06399EA130752CF567 |
| 78 | 14 | 2 | 6D767B88D28A455CC3B56C942BAFD8E465A50FD2C22F E6162E03A9AAC3C1CC899800610 |
| 79 | 15 | 2 | C5491C6CA3D998906EC1482F815B74B7C2E3816B682AC C6009AB7EFF34BF0E9CE59C754 |
| 80 | 16 | 2 | 237DB73895531253E3D7A62F485FD5D8ECAE11BE29E10 22DF659CB39A3C44120C5A0731 |
| 81 | 17 | 2 | 6D8EE32D30E19D93A0E5AD8226BAE9CF6FCBA17CF6E 67FDC5A15A81ECB8908BEDD77C80 |
| 82 | 18 | 2 | A1A67B19CD5E80A7C1DE5780D1E594990482AA96DA82 C64AE51AB7EF3857A8F0B162888 |
| 83 | 19 | 2 | 98F8BFDF774C7A249418E6FF4723D6E6AB2F091CDE4DE 1CE11D3BD463B509FB716940FD |
| 84 | 20 | 2 | 8E5AB6F13AAC09CA5854781ACA774F68238387806AD6C CC13EEF92B267F7FC576542AF1 |
| 85 | 21 | 2 | 477F8BD8905FDBF55191FC82D674094E080B539C743C19 C1064E6CA37CE692F52CB8164 |
| 86 | 22 | 2 | 7AFF110DBC3B44E4CA6054768146ABFAFFBB0862A196 D69A972FC318D922F620EA0F345 |
| 87 | 23 | 2 | 65300BAD8FFA21BC7DC2C1F79FA97A9F469CCC9E270A 61759F34D6276F57CBEB009CD21 |
| 88 | 24 | 2 | F51AB5A322B4FA8C8DA65D96582C575ECDF96FCAF41D DE3A84AF8663CF4141888FEC269 |
| 89 | 25 | 2 | 6F36BB6D5A7DC4FB720439E91FF0DE86DD6C4B93CFC4 271F2BCC6169616E3AEAA19E360 |
| 90 | 26 | 2 | 1A4186FD2DE2B2B5FFA3A96DD0AF4673026FFE4F14551 754CB2FE35E634F27A4CC7931B |
| 91 | 27 | 2 | 7B6FF9A8738324CBB48BBD575ABD339B581FE16742526 E2A62A2D8D030B8712B2488DEF |
| 92 | 28 | 2 | D318414132A10423E99D0D952BCE250F93056CFDD86E0 AC2839CFC816F195DACF581F30 |
| 93 | 29 | 2 | D056262D32B6B5C75D06411B5C3AB93B94FF48DDF9523 127F74104B873AE1114B60BF3E |
| 94 | 30 | 2 | D27B00C70A8AA2C036ADD4E99D047A376B363FEDC287 B8FD1A7794818C5873ECD0D3D56 |
| 95 | 31 | 2 | E7FDDCEED8D31B2C0752D976DE92BEA241A713CF818 C274AA1C2E3862C7EB7023AF35D4 |
| 96 | 0 | 0 | 0D26B8D5452948E30FD29D36E8404C8456657A6CBEEFC D91BB14F91E291F2C1C8F4119F |
| 97 | 1 | 1 | 2CC0EEF167D75102669A814D11A51E569D07A7433A9762 A292D7E2A4FE35B9130FD67DE |
| 98 | 2 | 2 | FB5CBD0CB6FA80C8B3560B4C443BA4900BF2729B16009 8C2F783A7752B8BA235010A1DA |
| 99 | 3 | 0 | 87BF4954022D30549DF7348477EACB97AC3565B838460C C62F242883313B15C31370335 |
| 100 | 4 | 1 | 076BF72542FB9FEBDEC3C316BC28CF0607BCEC5399EC9 228905375D3D15F929B586D7E6 |
| 101 | 5 | 2 | 82DD830BEDE4F13C76E4CF9AEF5E42609F0BDDCB000A 742B6372DD5225B0C3114494746 |
| 102 | 6 | 0 | 4E06E4CF46E1F5691938D7F40179D8F79A85216775384BD 97966DB4BBF49FB6FAB8F945 |
| 103 | 7 | 1 | 8A842EF53464D03A34EE088E38118CB89F79035272B8ED 06C8E13A16B34FBFC5BF9CDA4 |
| 104 | 8 | 2 | 43380948BFA0642029561E309F371E153174A4E7AC511F8 861BE87D9F4D9246C93C2A92 |
| 105 | 9 | 0 | 32DE5121E785059F81D9A777565C51EFBB4F61B77ED088 70652A4DC32DEA58A8CC6F456 |
| 106 | 10 | 1 | 64164534569A5E670FDB390D09C04802DD6A16B022CAD C77EDD7464AFED43C773A8DC76 |

TABLE 2-continued

Preambles modulation series for the 1K FFT mode

| Number | CellId | Segment | Series to modulate (in Hexadecimal format) |
|---|---|---|---|
| 107 | 11 | 2 | FB8769A81AA9DB607F14A6A95948401F83057CDC9C9C3996BA5821403A49F00A4E35191 |
| 108 | 12 | 0 | 77710D6F40B4F79CC63F678551C3EC18FA9DF2C82E6C8F415DADFD63264B7513180070E |
| 109 | 13 | 1 | 3843D2B038045CB9C516B325BC0E242311ACFA807FDC40A8AD259B77F376C931A6F6AF0 |
| 110 | 14 | 2 | 503F196BBF93C238BFD5E735E5AE52E0DAE64F5E2F4C3B92E553F51303C4A64C4403BF3 |
| 111 | 15 | 0 | CA346FCCF511822F524C043D2003F3B12DCFEA276B91BA98EB3984BBCFDF75C2A2E1B27 |
| 112 | 16 | 1 | 5FD4A6894566678C95B9D5A59DDE5366799045FEB03A2BAA74094140E9068C61C2E972C |
| 113 | 17 | 2 | E68AE62D2EE51B14F9D33ED737253CDB55A6E277254050830F2FE409E5EE284534FC3E5 |

TABLE 3

Preambles modulation series for the 512 FFT

| Number | CellId | Segment | Series to modulate (in Hexadecimal format) |
|---|---|---|---|
| 0 | 0 | 0 | 66C9CB4D1C8F31D60F5795886EE02FFF6BE4 |
| 1 | 1 | 0 | D8C30DA58B5ED71056C5D79032B80E05522C |
| 2 | 2 | 0 | 8EB62664E3B2C5222DE18E9000561F25AAFC |
| 3 | 3 | 0 | 3B32299087C257CD31C67E4AA5DD697B0E08 |
| 4 | 4 | 0 | 3B32299087C257CD31C67E4AA5DD697B0E08 |
| 5 | 5 | 0 | C07E0B0C5DB44071EE6CEC40CA3135CB5DB8 |
| 6 | 6 | 0 | C07E0B0C5DB44071EE6CEC40CA3135CB5DB8 |
| 7 | 7 | 0 | 89B08CD299A8AC757DB59107AF4E1EF1EE1C |
| 8 | 8 | 0 | 1B72E8C0ECFAABF050091382B411B45A718C |
| 9 | 9 | 0 | 5B33ED5A6303397EC3CCC35C8203A5A05178 |
| 10 | 10 | 0 | AD1173C461254BF9181238319F93F86AF964 |
| 11 | 11 | 0 | 2662789A0B78BA5EDEB403CE5D62A802D50C |
| 12 | 12 | 0 | 51E2005BBA69C858BCC741D84990B657271C |
| 13 | 13 | 0 | 21A03B607DD96F270CBC759B2A9BD6A84A34 |
| 14 | 14 | 0 | 4518EC4C7AD645D24AD949B42A7881403C7C |
| 15 | 15 | 0 | F8B70C595A37315D301D378A4D2848C821D4 |
| 16 | 16 | 0 | 487DD10C5F24C1A9AFD9D8F442B073446480 |
| 17 | 17 | 0 | F8B70C595A37315D301D378A4D2848C821D4 |
| 18 | 18 | 0 | FF42582005F8382C5CC6298D757155B36B24 |
| 19 | 19 | 0 | 599EF40107CBB3B30AF945365494A0D60570 |
| 20 | 20 | 0 | C6D6BE87F0D88458ABD22DE822B64E450738 |
| 21 | 21 | 0 | 5D4D86E62D6B3CA63F76C85AE79F14217408 |
| 22 | 22 | 0 | E043896829F236B10A35014D9E4F26ECB95C |
| 23 | 23 | 0 | 2347472A610FC084C71460393AEF36CBE928 |
| 24 | 24 | 0 | 5F4D880DC516DC0B3860DA948225D2BC6770 |
| 25 | 25 | 0 | 9EFEEA99631FAF0D9589E9640BCD56C5FF08 |
| 26 | 26 | 0 | 9EFEEA99631FAF0D9589E9640BCD56C5FF08 |
| 27 | 27 | 0 | FE792EF83B235B3D4A6447BED27035454BC0 |
| 28 | 28 | 0 | B3B1B868C121C4555A64161B654A4FE81D70 |
| 29 | 29 | 0 | 476EA99AF9F73D018EB649F2EE789CE0B4EC |
| 30 | 30 | 0 | B7C2D44078510ADD2447D93E8A1231AE3910 |
| 31 | 31 | 0 | 16A9D8F71CC1CD0EFA0008AA343A7A4ADA4C |
| 32 | 0 | 1 | 2815DA9666DFBCCFAEEA82F965B70E06F42C |
| 33 | 1 | 1 | 7389FDE96166E7E40F7A6778AA02944937A4 |
| 34 | 2 | 1 | 7389FDE96166E7E40F7A6778AA02944937A4 |
| 35 | 3 | 1 | A0598A0907798B3465DD8CBD08565F0FB5B8 |
| 36 | 4 | 1 | 0E75B3C128085C954A25E5808FC5833A8FB0 |
| 37 | 5 | 1 | BBCDA362265B4D4D2BEE80F635E638316280 |
| 38 | 6 | 1 | 660047B06A1B5FAE6A9F0679DBCA9B1A2DF4 |
| 39 | 7 | 1 | 117773F464DFB00EC570DB2C8546B534A388 |
| 40 | 8 | 1 | 2594AE119CB87E802D67EF7EE0EAE99474CC |
| 41 | 9 | 1 | 2594AE119CB87E802D67EF7EE0EAE99474CC |
| 42 | 10 | 1 | 86823FCCBA812BF28F4EF65732E938361484 |
| 43 | 11 | 1 | 8800AECA9BF4C9CB5B4A32D950E1B8FC8740 |
| 44 | 12 | 1 | 8FB3FA462D2CFAF842BB5319D9786A997C10 |
| 45 | 13 | 1 | 8FB3FA462D2CFAF842BB5319D9786A997C10 |
| 46 | 14 | 1 | 599E199B609C0C654DB053E8C94F343AAFF8 |
| 47 | 15 | 1 | E0187D89220D11B5F60DAC078A5E2EED6EF0 |
| 48 | 16 | 1 | E0187D89220D11B5F60DAC078A5E2EED6EF0 |
| 49 | 17 | 1 | B71B524A36024F5B93F827D59DE7DF2238F8 |
| 50 | 18 | 1 | 304CD86DFE201256227046C3D0AE7D5F51CC |
| 51 | 19 | 1 | D2D899FBB154C422F25F218E432E483AE7A0 |
| 52 | 20 | 1 | CB766885201284B65C6460F29AAE9411BF18 |
| 53 | 21 | 1 | 69F57E074F14A10FEC6144C26E98C4688330 |
| 54 | 22 | 1 | 24C5314B4FC521470F94DFE0F72AB8DB1910 |
| 55 | 23 | 1 | 6E4E07CC03CD3E0BDEEAB58975B4CA8E777C |
| 56 | 24 | 1 | D2C4067132528AA41BBE61A9C171A382F768 |
| 57 | 25 | 1 | B027CB82594D3900700B541A99CCD5FD5870 |
| 58 | 26 | 1 | 24C5314B4FC521470F94DFE0F72AB8DB1910 |
| 59 | 27 | 1 | 76A0B07A726FB16B905A4678708759042288 |
| 60 | 28 | 1 | E9B565C61F73EC6633A1F2D96EC409495B80 |
| 61 | 29 | 1 | E9B565C61F73EC6633A1F2D96EC409495B80 |
| 62 | 30 | 1 | EBD7E29110582C5951233AB22B03DE709698 |
| 63 | 31 | 1 | 0CCA91DA1B42B0B55C924F32B08B1FAE0E18 |
| 64 | 0 | 2 | 60F073332D4EE53CC709FFF645F545AA0348 |
| 65 | 1 | 2 | 928E1442069F540326E72775785C2788D3A4 |
| 66 | 2 | 2 | 928E1442069F540326E72775785C2788D3A4 |
| 67 | 3 | 2 | 5633AC03D79BE3901A79E1FFAF65B3756448 |
| 68 | 4 | 2 | 0F93A3C4ED837D800637B5F52FB1D73B9A68 |
| 69 | 5 | 2 | F110CE0220306AD14EECEC07AC36EB28725C |
| 70 | 6 | 2 | A4213FFB85B56E27C74FC6ECBA359875438C |
| 71 | 7 | 2 | 1A37F92589686CFE5E4D4BFD8E2BC63AA8CC |
| 72 | 8 | 2 | 1A37F92589686CFE5E4D4BFD8E2BC63AA8CC |
| 73 | 9 | 2 | 31531C7B2F7518BF59ACFB216FC74D09F2F4 |
| 74 | 10 | 2 | CE026112DF00BB74E1B1F43B595112B16344 |
| 75 | 11 | 2 | 503494DE054AE395883AEDD8CC7801B8F124 |
| 76 | 12 | 2 | 503494DE054AE395883AEDD8CC7801B8F124 |
| 77 | 13 | 2 | 261EAF7C9AFAB5109DEC8A968A79F90F10CC |
| 78 | 14 | 2 | 234AEE2720BAF6D7C7D6B9E628177243EC98 |
| 79 | 15 | 2 | 8447E25CA9A0EE1CFB9FADB6C42B8F565B3C |
| 80 | 16 | 2 | 8447E25CA9A0EE1CFB9FADB6C42B8F565B3C |
| 81 | 17 | 2 | E571539289316AB94B6DF923124F5F91CF34 |
| 82 | 18 | 2 | 757C45DA8F140FB6E71024294B2439CDACFC |
| 83 | 19 | 2 | F2A59A32B51CE505E45E9B5C7C7DBE880DF4 |
| 84 | 20 | 2 | 06EA6FE59D24AFFF1A789F068ACE32B76A54 |
| 85 | 21 | 2 | FBDD67D1E2F87744FA17E6821AD8D8D3A528 |
| 86 | 22 | 2 | DCC89E78138BAFE47555B6F97128D4F394A4 |
| 87 | 23 | 2 | 34DFF9E83D74050A72C61908EC53E8C0CC88 |
| 88 | 24 | 2 | 8DFBF09479BC91E466A539E077D2B26A8B2C |
| 89 | 25 | 2 | BE4DEB5A007D6B39A0CA0611C323A7A6716C |
| 90 | 26 | 2 | 38BCA168FED54EEF63E858444D0CB936C108 |
| 91 | 27 | 2 | 15CA281F8FC9BFBF340FAC8EE3236D3972D4 |
| 92 | 28 | 2 | 1C6FB87D76DB82FFA1E492166684CACEE560 |
| 93 | 29 | 2 | 524CF9B10D3F1AF51BAF9731980C2CF41D60 |
| 94 | 30 | 2 | 524CF9B10D3F1AF51BAF9731980C2CF41D60 |
| 95 | 31 | 2 | E0503D5DFA4A57704C718920F3245A436624 |
| 96 | 0 | 0 | A32CF584137FDF1D4CCE6A1CF40FEC1F4AE0 |
| 97 | 1 | 1 | EC4D3AC52136FA468F28777078C8A82C0808 |
| 98 | 2 | 2 | 379C84F3A2A3EFEC4B866EB8710D209A54BC |
| 99 | 3 | 0 | 30CABB208C9D6C774814A163765E4ACBC540 |
| 100 | 4 | 1 | 30CABB208C9D6C774814A163765E4ACBC540 |
| 101 | 5 | 2 | 7AED914DFCB6A06858382BC4ABC6625C44D0 |

TABLE 3-continued

Preambles modulation series for the 512 FFT

| Number | Cell-Id | Segment | Series to modulate (in Hexadecimal format) |
|---|---|---|---|
| 102 | 6 | 0 | CA3448C6716F6F8D15D7372A3A4F6E825A14 |
| 103 | 7 | 1 | 1C7B1FD490936A2B573037CDF699BD50F068 |
| 104 | 8 | 2 | 2D0FC9267E8546393BF113A1AEA2922128C0 |
| 105 | 9 | 0 | ABD1526F4A510F820B689F30C1E7B88C8848 |
| 106 | 10 | 1 | D9F00A909C7B9D92E7EE8477CB50D9456580 |
| 107 | 11 | 2 | 9AA34CA12E72C28DD0E97E5DCC4808C36700 |
| 108 | 12 | 0 | 36D738CD3F9F8D2D3BFB20F6AA32B31540F8 |
| 109 | 13 | 1 | D54203CE6775B80D1963027DA3EB12D7C9D0 |
| 110 | 14 | 2 | 7AC41CAAE627C46C2FCD23D9B7DECB2E2E18 |
| 111 | 15 | 0 | 7AC41CAAE627C46C2FCD23D9B7DECB2E2E18 |
| 112 | 16 | 1 | 94E4E2AE2C4E47FD7D0A154C25BF40F759E0 |
| 113 | 17 | 2 | 43BFFD566D85BE162650670BE1A3CA523284 |

TABLE 4

Preambles modulation series for the 128 FFT mode

| Number | CellId | Segment | Series to modulate (in Hexadecimal format) |
|---|---|---|---|
| 0 | 0 | 0 | 01E52A9B3 |
| 1 | 1 | 0 | C96FF8AB1 |
| 2 | 2 | 0 | A1F5CE648 |
| 3 | 3 | 0 | 1E2BF6919 |
| 4 | 4 | 0 | 051798B72 |
| 5 | 5 | 0 | 932D7FA8E |
| 6 | 6 | 0 | 932D7FA8E |
| 7 | 7 | 0 | 2CBD50F73 |
| 8 | 8 | 0 | F86F6A451 |
| 9 | 9 | 0 | 2BA44F7E7 |
| 10 | 10 | 0 | EEFA172C3 |
| 11 | 11 | 0 | FF46C729A |
| 12 | 12 | 0 | 11C1DEA49 |
| 13 | 13 | 0 | E02B1D6D9 |
| 14 | 14 | 0 | 0362D5C61 |
| 15 | 15 | 0 | 27DDC7CA5 |
| 16 | 16 | 0 | 17EAEDAC6 |
| 17 | 17 | 0 | 94ACD9E03 |
| 18 | 18 | 0 | F01472932 |
| 19 | 19 | 0 | D345E8C40 |
| 20 | 20 | 0 | 1A1AC22DD |
| 21 | 21 | 0 | FD5E18DA6 |
| 22 | 22 | 0 | 07116DA91 |
| 23 | 23 | 0 | 35DEB6E0E |
| 24 | 24 | 0 | A0185E326 |
| 25 | 25 | 0 | 93B3F9C75 |
| 26 | 26 | 0 | 0FF3CDCD5 |
| 27 | 27 | 0 | AAD266780 |
| 28 | 28 | 0 | 632481EA8 |
| 29 | 29 | 0 | 9B2D6A380 |
| 30 | 30 | 0 | B5D3C6740 |
| 31 | 31 | 0 | C1DDDF6A5 |
| 32 | 0 | 1 | 8BB8104A5 |
| 33 | 1 | 1 | 64C4215F0 |
| 34 | 2 | 1 | 64C4215F0 |
| 35 | 3 | 1 | 6B7C8AE0C |
| 36 | 4 | 1 | 0CE481A55 |
| 37 | 5 | 1 | AA5B9E7E6 |
| 38 | 6 | 1 | 87C89EF75 |
| 39 | 7 | 1 | 5A83EF8CC |
| 40 | 8 | 1 | 207AA794C |
| 41 | 9 | 1 | FA3A6D7AC |
| 42 | 10 | 1 | 6A4D1C403 |
| 43 | 11 | 1 | 972C3FCEE |
| 44 | 12 | 1 | 44B91C10D |
| 45 | 13 | 1 | 404AD1671 |
| 46 | 14 | 1 | 8039A8B46 |
| 47 | 15 | 1 | 7761B4BD7 |
| 48 | 16 | 1 | 78376108A |
| 49 | 17 | 1 | 31ABBF06D |
| 50 | 18 | 1 | 69C6E455F |
| 51 | 19 | 1 | AB3B3CFF0 |
| 52 | 20 | 1 | 15319240F |
| 53 | 21 | 1 | 731412685 |
| 54 | 22 | 1 | E1A55FF33 |
| 55 | 23 | 1 | 0FF3CDCD5 |
| 56 | 24 | 1 | A3135C034 |
| 57 | 25 | 1 | FC9DB558E |
| 58 | 26 | 1 | FECCB2B85 |
| 59 | 27 | 1 | AA37BDA7C |
| 60 | 28 | 1 | 90955CE1F |
| 61 | 29 | 1 | ADBC1B844 |
| 62 | 30 | 1 | A04A3B197 |
| 63 | 31 | 1 | 015E56CB3 |
| 64 | 0 | 2 | 38E8240AD |
| 65 | 1 | 2 | 382A846DB |
| 66 | 2 | 2 | E4D7DE350 |
| 67 | 3 | 2 | E4D7DE350 |
| 68 | 4 | 2 | ABCF97B09 |
| 69 | 5 | 2 | 249DEABE3 |
| 70 | 6 | 2 | B233CA140 |
| 71 | 7 | 2 | B233CA140 |
| 72 | 8 | 2 | 543C676DB |
| 73 | 9 | 2 | DBE7E42AE |
| 74 | 10 | 2 | DBE7E42AE |
| 75 | 11 | 2 | A7957FC4C |
| 76 | 12 | 2 | 64D6F4038 |
| 77 | 13 | 2 | 4D0F99EF5 |
| 78 | 14 | 2 | D2DD02238 |
| 79 | 15 | 2 | FEA763CB2 |
| 80 | 16 | 2 | 3672D5700 |
| 81 | 17 | 2 | 64D6F4038 |
| 82 | 18 | 2 | 8CE0D5FB6 |
| 83 | 19 | 2 | CC25D7A7E |
| 84 | 20 | 2 | CC25D7A7E |
| 85 | 21 | 2 | CC25D7A7E |
| 86 | 22 | 2 | 1DCEBCBB6 |
| 87 | 23 | 2 | 55B6F39F8 |
| 88 | 24 | 2 | 01ECB468C |
| 89 | 25 | 2 | 6F6C13855 |
| 90 | 26 | 2 | 5DA531038 |
| 91 | 27 | 2 | 7019D3A92 |
| 92 | 28 | 2 | 784CF7EAB |
| 93 | 29 | 2 | 5AAC86FCF |
| 94 | 30 | 2 | E98250DC4 |
| 95 | 31 | 2 | 3F0C9ABBD |
| 96 | 0 | 0 | 57ED9398F |
| 97 | 1 | 1 | C725A2E40 |
| 98 | 2 | 2 | 64F194A80 |
| 99 | 3 | 0 | 575A313E4 |
| 100 | 4 | 1 | E4BEEBD18 |
| 101 | 5 | 2 | 332D6AA0F |
| 102 | 6 | 0 | FBD62ECA6 |
| 103 | 7 | 1 | 38665B015 |
| 104 | 8 | 2 | 07085DAC8 |
| 105 | 9 | 0 | 4CEEB5E1F |
| 106 | 10 | 1 | 9E5CD5B80 |
| 107 | 11 | 2 | B428BA19C |
| 108 | 12 | 0 | 63A76FD05 |
| 109 | 13 | 1 | 517C8460C |
| 110 | 14 | 2 | A1B58A608 |
| 111 | 15 | 0 | 558DA7003 |
| 112 | 16 | 1 | FF64761CA |
| 113 | 17 | 2 | 7DF07735A |

TABLE 5

Preambles modulation series for the 1K FFT mode

| Number | CellId | Segment | Series to modulate (in Hexadecimal format) |
|---|---|---|---|
| 0 | 0 | 0 | A6F294537B285E1844677D133E4D53CCB1F182DE00489E53E6B6E77065C7EE7D0ADBEAF |
| 1 | 1 | 0 | 668321CBBE7F462E6C2A07E8BBDA2C7F7946D5F69E35AC8ACF7D64AB4A33C467001F3B2 |
| 2 | 2 | 0 | 1C75D30B2DF72CEC9117A0BD8EAF8E0502461FC07456AC906ADE03E9B5AB5E1D3F98C6E |
| 3 | 3 | 0 | 5F9A2E5CA7CC69A5227104FB1CC2262809F3B10D0542B9BDFDA4A73A7046096DF0E8D3D |
| 4 | 4 | 0 | 82F8A0AB918138D84BB86224F6C342D81BC8BFE791CA9EB54096159D672E91C6E13032F |
| 5 | 5 | 0 | EE27E59B84CCF15BB1565EF90D478CD2C49EE8A70DE368EED7C9420B0C6FFAF9AF035FC |
| 6 | 6 | 0 | C1DF5AE28D1CA6A8917BCDAF4E73BD93F931C44F93C3F12F0132FB643EFD5885C8B2BCB |
| 7 | 7 | 0 | FCA36CCCF7F3E0602696DF745A68DB948C57DFA9575BEA1F05725C42155898F0A63A248 |
| 8 | 8 | 0 | 024B0718DE6474473A08C8B151AED124798F15D1FFCCD0DE574C5D2C52A42EEF858DBA5 |
| 9 | 9 | 0 | D4EBFCC3F5A0332BEA5B309ACB04685B8D1BB4CB49F9251461B4ABA255897148F0FF238 |
| 10 | 10 | 0 | EEA213F429EB926D1BDEC03ABB67D1DE47B4738F3E929854F83D18B216095E6F546DADE |
| 11 | 11 | 0 | C03036FA9F253045DF6C0889A8B83BAEFCF90EB993C2D79BD911CA84075061AA43DA471 |
| 12 | 12 | 0 | 1E68EC22E5E2947FB0A29E4CC70597254B36C60331EACF779FE752D3F55DC41ABFC7DC9 |
| 13 | 13 | 0 | 63A57E75A0434F035AAC4504B265081D497F10C77928B71797C5D6C6824DC0F23BE34EE |
| 14 | 14 | 0 | C57C4612816DE981C58FD6F8DE9DD41F2422ADBC522B0CE31F9A6D5F2A126DC08F69FB1 |
| 15 | 15 | 0 | 978256AF184E7ED17789B33D324C711B36BFBCCE5446EB03687E9A0A839C7CE156104D2 |
| 16 | 16 | 0 | 011EC823157DD73150640CEB7DDB0A1F8F91E09599A851D5C7CAF687CFB752D297D82FC |
| 17 | 17 | 0 | C6DE82BEB7F57B9120E8A376D85C8F70FDC65BC660402DAC4AE6002EA2740C4F9E5973C |
| 18 | 18 | 0 | 4C74929D6F9FAB9E5BB761026038E076F6824295E0AF397806ECEBC6DC713F03ACDC27C |
| 19 | 19 | 0 | 13E1E85C2234D0F3418001A35F135E10C6C918C36BC659FDA9D655D288A0BDAA8BF489D |
| 20 | 20 | 0 | FD4AF2D8F4F08F1A7DF59291C9AEE788F641B8231CFB813376E0BEB68DFCFCBBE552445 |
| 21 | 21 | 0 | EBBC77A493AA0C62C62F25EE5E8D0701F50386F49026FA31487C9FD5C5206CE4EB00576 |
| 22 | 22 | 0 | 134F936F9E875842587ADCA92187F2FC6D62FFC3A833D8CDE465F9972ABAA83763AAEB7 |
| 23 | 23 | 0 | 3CD1DA70670BC73363D1B4A66D280FF6AA7636D07ECF32BA26101E5EBA1594FB8A0420A |
| 24 | 24 | 0 | 918296B2937C2B6F73CF98F85A81B723D1C69DBDF3E019749C582DA22E789562729D475 |
| 25 | 25 | 0 | C323981B8B2240865F48D61AE1B3B61D88522B7358952F949D4308CA15D1EE8FDFA683F |
| 26 | 26 | 0 | 7514A6FA5FBB250C5C8CE96F791D676036C344A44B24284477B44CB3E758F8BCD58F05B |
| 27 | 27 | 0 | 84C7FEC6E977FA1EC0C7CC9E0D067C73D8F846F82ABB3456D2104E1448D5A58D5975152 |
| 28 | 28 | 0 | 4841AFC277B86A0E067AF319422F501C87ACBFBDD66BFEA3644F879AE98BA8C5D605123 |
| 29 | 29 | 0 | F35EA87318E459138A2CE69169AD5FD9F30B62DA04ED21320A9F59893F0D176752152FD |
| 30 | 30 | 0 | A0C5F35C5971CD3DC55D7D2B9FD27AA17A198583F580EB0800744EE5B6B3648DEA95840 |
| 31 | 31 | 0 | A6D3D33AD9B56862DBF076E3ACE6A3150510CCC8BE77DE4E6E10EB5FE163765647D07DF |
| 32 | 0 | 1 | 52849D8F020EA6583032917F36E8B62DFD18AD4D77A7D2D8EC2D4F20CC0C75B7D4DF708 |
| 33 | 1 | 1 | CC53A152209DEC7E61A06195E3FA633076F7AE1BAFFE83CE565087C0507BA596E0BD990 |
| 34 | 2 | 1 | 17D98A7E32CCA9B142FE32DB37B2BF726E25AA7A557FFB5C400B47A38B16CF18E1EDE63 |
| 35 | 3 | 1 | A5BA8C7E2C795C9F84EBBD425992766BDE5549A7A9F7EF7E44AFD941C6084568638FE84 |
| 36 | 4 | 1 | 33E57E78A5696255CA61AE36027036DA619E493A0A8F95D9915C6E61F3006CB9706BEBA |
| 37 | 5 | 1 | 09961E7309A9B7F3929C370C51910EBAB1B4F409FA976AE8679F354C84C4051F371F902 |

TABLE 5-continued

Preambles modulation series for the 1K FFT mode

| Number | CellId | Segment | Series to modulate (in Hexadecimal format) |
|---|---|---|---|
| 38 | 6 | 1 | 508A9EBAEF3C7E09CFCFC0B6F444A09B45A130EFC8C5B22BCE87213854E7C9D329C9ADC |
| 39 | 7 | 1 | AACEEF9BCDC82E4AD525185B07CBABCB74861D16F7C25CFBA917B05463AD65391AF840D |
| 40 | 8 | 1 | 23060ACC5A125DAB207EEEE47B4EEE1E8466BD17DDA2EB3CD90D2AB7A758C213E6D7FE5 |
| 41 | 9 | 1 | CA55521667BDA8B6F1B205201A51B3A0C05DE9EA06BC73268730A81A992777021F46055 |
| 42 | 10 | 1 | 05ADFCA2F8207DC6FF8D1A85A1DD4694D4C48A838C4F833C532710021AC448A7B62B8DD |
| 43 | 11 | 1 | 218C951223D7B712DC98F8B5217388A830003C5F2A00F232DD3475D2FC78C25B8D88FF9 |
| 44 | 12 | 1 | 79B94D24D721121EF678B7156F8D2666DE712BBF3837C85A9518781903146A7B4D42A28 |
| 45 | 13 | 1 | 58AABEF6A6BDE4011CAC583C5104B2C6FC5A2980F856373E5931A3C690245327581FA13 |
| 46 | 14 | 1 | 427D1AD18E338E16FCE6E23B4AD6D82A2144D53048F2665AA94577AFABD26889FCB1F9F |
| 47 | 15 | 1 | 337FE0E4C15A22471AE0F6B6F91161A7DE2E1403D73587D5C8355105D2F70642B2CE425 |
| 48 | 16 | 1 | A3FCAA311B536AC9DB39FED9F4E996506B3181C58D6B7E04157A3FD463F60468765BCFD |
| 49 | 17 | 1 | F484FD1F57F53A4A749B86148E0B1D0653667CE1393198875DDB0AE9179BBBDAAD53A11 |
| 50 | 18 | 1 | A3E9ECF1E6048562BC89DB6168E708855F0D4AD29F859EF36C9160DF407D85426233632 |
| 51 | 19 | 1 | 890519376D1FFAA2894EABCD6663B0A3C2411982C17B01270E0FB0B289D4BC8C3B83DA9 |
| 52 | 20 | 1 | 09847B6187BB5F6F6728B4ED610088FAD9DADFC00748E9DCD8A0CE320D6C991654ABE05 |
| 53 | 21 | 1 | 3285AE0A3D196313659C37BE1C94D61D20F11FD49D9FDF9D1026FF5763F02CB78AE135C |
| 54 | 22 | 1 | 0069D3F34D0D455AFB45FEFDF716333B785C6BDA90DA23F1CC68BC6A1DBC916C595DA3E |
| 55 | 23 | 1 | AA977A8BCA39381E7C35A1ACC7C4F60421C0862BFD6106C7C025B0676EA0EF68972DD8F |
| 56 | 24 | 1 | F310745C497094ABE56E0490C0800319DBE290553E696B6859635AF03B121F79D925D19 |
| 57 | 25 | 1 | 964DFD350B9C7DFDC7F6F7C43283A76F0D613E48A5520D1DAF761C6F47E389B43A023F5 |
| 58 | 26 | 1 | 6D767B88D28A455CC3B56C942BAFD8E465A50FD2C22FE6162E03A9AAC3C1CC899800610 |
| 59 | 27 | 1 | C5491C6CA3D998906EC1482F815B74B7C2E3816B682ACC6009AB7EFF34BF0E9CE59C754 |
| 60 | 28 | 1 | 6D8EE32D30E19D93A0E5AD8226BAE9CF6FCBA17CF6E67FDC5A15A81ECB8908BEDD77C80 |
| 61 | 29 | 1 | 98F8BFDF774C7A249418E6FF4723D6E6AB2F091CDE4DE1CE11D3BD463B509FB716940FD |
| 62 | 30 | 1 | 65300BAD8FFA21BC7DC2C1F79FA97A9F469CCC9E270A61759F34D6276F57CBEB009CD21 |
| 63 | 31 | 1 | 6F36BB6D5A7DC4FB720439E91FF0DE86BD6C4B93CFC4271F2BCC6169616E3AEAA19E360 |
| 64 | 0 | 2 | D27B00C70A8AA2C036ADD4E99D047A376B363FEDC287B8FD1A7794818C5873ECD0D3D56 |
| 65 | 1 | 2 | E7FDDCEED8D31B2C0752D976DE92BEA241A713CF818C274AA1C2E3862C7EB7023AF35D4 |
| 66 | 2 | 2 | 87BF4954022D30549DF7348477EACB97AC3565B838460CC62F242883313B15C31370335 |
| 67 | 3 | 2 | 82DD830BEDE4F13C76E4CF9AEF5E42609F0BDDCB000A742B6372DD5225B0C3114494746 |
| 68 | 4 | 2 | 4E06E4CF46E1F5691938D7F40179D8F79A85216775384BD97966DB4BBF49FB6FAB8F945 |
| 69 | 5 | 2 | 64164534569A5E670FDB390D09C04802DD6A16B022CADC77EDD7464AFED43C773A8DC76 |
| 70 | 6 | 2 | FB8769A81AA9DB607F14A6A95948401F83057CDC9C9C3996BA5821403A49F00A4E35191 |
| 71 | 7 | 2 | 77710D6F40B4F79CC63F678551C3EC18FA9DF2C82E6C8F415DADFD63264B7513180070E |
| 72 | 8 | 2 | 503F196BBF93C238BFD5E735E5AE52E0DAE64F5E2F4C3B92E553F51303C4A64C4403BF3 |
| 73 | 9 | 2 | 5FD4A6894566678C95B9D5A59DDE5366799045FEB03A2BAA74094140E9068C61C2E972C |
| 74 | 10 | 2 | 95B584DC40C8B5DEAD63D48FCE65B1E61BAB4C597D921DB12677141E2FFE7C0AA3DA0D5 |
| 75 | 11 | 2 | 985763AB6CC8934DB8A0BE738A7AF1D1FA3958C1F9E2D6A51A163E47A0A6E5FEB759FDD |

TABLE 5-continued

Preambles modulation series for the 1K FFT mode

| Number | CellId | Segment | Series to modulate (in Hexadecimal format) |
|---|---|---|---|
| 76 | 12 | 2 | FD8D45F00D943AD986BD353D61C6746DBF8A309B6AE1C173B880D957B76DC031A957E8D |
| 77 | 13 | 2 | AE4323534F6EFB1A20169328417885EF304FA220389FA9C2607E5A406F4CE4A7498A39F |
| 78 | 14 | 2 | E5205579893BE184CB9948C28E2F9AAF699D47B6E5E0B219CBEAFE4BEC8D561BD809E34 |
| 79 | 15 | 2 | AB11D6941478D36D5695CE813070DC1E32122A39083E53FE373660AEB125D83383FBDCA |
| 80 | 16 | 2 | 188A09C46F1F11206FF9F15CFB5F6CD2F26C4BF485EE37D3650A595064F76CE34E40EAD |
| 81 | 17 | 2 | 4B1CDE25539A56CEDC45FE7F54C38CF155F4FB1AE868F6C3952D07014BF828E810BDE2D |
| 82 | 18 | 2 | 16CA8F8C6A879E865E3611EAC389D56AFA3E4E84CDBB73567BA4A160249C4B680A7D9BC |
| 83 | 19 | 2 | 39D2B08AA0E2E8781476027B41AD72F8D9838B7001AADFD33A92D81E56ECBB2C9378D58 |
| 84 | 20 | 2 | 8C258BC80D4AD125F335A5151EDF9E9A463E06C5C8D046F82E5DC3D73EF4D2231C5D14F |
| 85 | 21 | 2 | 41A029C6356C825585179C5348EDF07A3AC2022539AC28DC4CD3C1DFADC8EE9644CD939 |
| 86 | 22 | 2 | 0D70A77CBE9804913BFBEC4FBF917C5CD3580F6062BBAD3F99ECEBB4A9EBB87523AB722 |
| 87 | 23 | 2 | 6A00A30901F9FDE44B4F1ECED44E0BCB943B29519F313BE4496D34F39B154FC2384CB75 |
| 88 | 24 | 2 | 95351107A8BE6ABFC24C1292FE1A0FE677CBFD04F2E81178CAA9D294730EF9C946F676E |
| 89 | 25 | 2 | 01F21470FD9B1E0B3C6B2F7C0412A15764C277D61BA2EE3B3769DE7ADACB2BB29918FB7 |
| 90 | 26 | 2 | A578ABFE155369440FA3D4DF757CCA596469B80A0E56BFE6010DD63E67CEDB86BB1EF39 |
| 91 | 27 | 2 | 1E1CFFAB031836777DE5D168A9246C559574C74CCC06405EB406B8DDB7C9A6EF54A66A5 |
| 92 | 28 | 2 | 354149C2CA19A735F9CD04AF4922E8ECE6509B978B951F946FD4AD36C7F9C83624205E7 |
| 93 | 29 | 2 | 5A27E60DEA547D0D41897A03199F28A967AC51728E3B38325B4FBECF1B85A7EE9B04182 |
| 94 | 30 | 2 | 784DA3B16B810FE3B851060AD7BD27D9D9457F6C8899A13D311E531B855C15ECE6D3A2F |
| 95 | 31 | 2 | D7DFBC65797633A8C13D3EEC781D48952338136063B579D69437B28B744B5A4BE18AFA9 |
| 96 | 0 | 0 | 61AF26BD39A9FFF52826625E04ADA299385A373FA946D837D754E6CFEBB26F5C03B87CF |
| 97 | 1 | 1 | D77D97CDB93DBEAA65CAFA146F40D72B5E80944F750E07325DC164ED60F32434BC7187D |
| 98 | 2 | 2 | 4529D9CA65AF49C1C39BDC18CFAB87E03FE4DAFC0A48FF1457D46B0DF66B414A23ACDDB |
| 99 | 3 | 0 | 33AC0261DAA57C1D611EBA1C730D50AFEE5BE3E849030A4E891BC8C5F4C78DCDDFEA263 |
| 100 | 4 | 1 | BED48C704F02A84F03BCD299D919DA56F7B71EDF8A0F8A25E8F8496F95A44CE2B9F74C9 |
| 101 | 5 | 2 | 0ECCBE0902EBF4B4C29506014A3706622784B7B2D5153E10AD3112DC5E45277A32E79DE |
| 102 | 6 | 0 | 7CB4937889C7DFD9AA2D37235E06F993D3D4F5D515B39CA652F62397C08457D66BC5A36 |
| 103 | 7 | 1 | 43F23F6CAC6C43896B3EDBF00E1CBD42E2CC75E2A996448F0FCF17F6779DD6E356FED11 |
| 104 | 8 | 2 | 72C8A209FBC4A568BEF03BCFE1B0D959F977B0963780B4E54E2B9A1016344ACB7EE3E3A |
| 105 | 9 | 0 | 77AEB9E50DC3727849A94FBFFCDB5B9589AF50ABD8A58808B9663058E17A2EBC496DF43 |
| 106 | 10 | 1 | 667123C89077FE4AAAEF15C635E976C6811682D478FFC7B721A76B5A38697DF4FB7D2CE |
| 107 | 11 | 2 | CBD6C5C9BE55B0BE76AD03392E8A8AB9A86063DB31B79280B447980BB841FD7E9DC6B9B |
| 108 | 12 | 0 | C7D7DEF8B3C9C8667D8D65063B4DAD1FF69445C87CA71DA955D0CA23970E988A6EA4C83 |
| 109 | 13 | 1 | FB246ABD92F9E560CB2BEC2317204C9CE22AD3BD19EA02E90F5F3B7F4F65538D8ED098E |
| 110 | 14 | 2 | 29E74579472FDD8FFC2700B2BF33C649989DD8153093A7CA08B50F7A5E4BAED108A0F0D |
| 111 | 15 | 0 | A27F29D8D6CCD7EB4BBE303C3E9E95802DB98BFD5B8ED03B88304359D92E3EC108CA3C8 |

TABLE 5-continued

Preambles modulation series for the 1K FFT mode

| Number | CellId | Segment | Series to modulate (in Hexadecimal format) |
|---|---|---|---|
| 112 | 16 | 1 | 3FE70E26FA00327FE3B2BE6BC5D5014F588F09C17D222C146DD68B4824692A651888C76 |
| 113 | 17 | 2 | 41E91307EC58801CFF2C7E9CFEFBEB71681FAE2BEAEC72D4E4556E99345D3BA4B369B59 |

TABLE 6

Preambles modulation series for the 512 FFT mode

| Number | Cell-Id | Segment | Series to modulate (in Hexadecimal format) |
|---|---|---|---|
| 0 | 0 | 0 | 66C9CB4D1C8F31D60F5795886EE02FFF6BE4 |
| 1 | 1 | 0 | D8C30DA58B5ED71056C5D79032B80E05522C |
| 2 | 2 | 0 | 8EB62664E3B2C5222DE18E9000561F25AAFC |
| 3 | 3 | 0 | 3B32299087C257CD31C67E4AA5DD697B0E08 |
| 4 | 4 | 0 | C07E0B0C5DB44071EE6CEC40CA3135CB5DB8 |
| 5 | 5 | 0 | 89B08CD299A8AC757DB59107AF4E1EF1EE1C |
| 6 | 6 | 0 | 1B72E8C0ECFAABF050091382B411B45A718C |
| 7 | 7 | 0 | 5B33ED5A6303397EC3CCC35C8203A5A05178 |
| 8 | 8 | 0 | AD1173C461254BF9181238319F93F86AF964 |
| 9 | 9 | 0 | 51E2005BBA69C858BCC741D84990B657271C |
| 10 | 10 | 0 | 21A03B607DD96F270CBC759B2A9BD6A84A34 |
| 11 | 11 | 0 | 4518EC4C74AD645D24AD949B42A7881403C7C |
| 12 | 12 | 0 | F8B70C595A37315D301D378A4D2848C821D4 |
| 13 | 13 | 0 | FF42582005F8382C5CC6298D757155B36B24 |
| 14 | 14 | 0 | 599EF40107CBB3B30AF945365494A0D60570 |
| 15 | 15 | 0 | C6D6BE87F0D88458ABD22DE822B64E450738 |
| 16 | 16 | 0 | E043896829F236B10A35014D9E4F26ECB95C |
| 17 | 17 | 0 | 2347472A610FC084C71460393AEF36CBE928 |
| 18 | 18 | 0 | 5F4D880DC516DC0B3860DA948225D2BC6770 |
| 19 | 19 | 0 | 9EFEEA99631FAF0D9589E960BCD56C5FF08 |
| 20 | 20 | 0 | FE792EF83B235B3D4A6447BED27035454BC0 |
| 21 | 21 | 0 | B3B1B868C121C4555A64161B654A4FE81D70 |
| 22 | 22 | 0 | B7C2D44078510ADD2447D93E8A1231AE3910 |
| 23 | 23 | 0 | 16A9D8F71CC1CD0EFA0008AA343A7A4ADA4C |
| 24 | 24 | 0 | 7389FDE96166E7E40F7A6778AA02944937A4 |
| 25 | 25 | 0 | A0598A0907798B3465DD8CBD08565F0FB5B8 |
| 26 | 26 | 0 | 0E75B3C128085C954A25E5808FC5833A8FB0 |
| 27 | 27 | 0 | BBCDA362265B4D4D2BEE80F635E638316280 |
| 28 | 28 | 0 | 660047B06A1B5FAE6A9F0679DBCA9B1A2DF4 |
| 29 | 29 | 0 | 2594AE119CB87E802D67EF7EE0EAE99474CC |
| 30 | 30 | 0 | 8FB3FA462D2CFAF842BB5319D9786A997C10 |
| 31 | 31 | 0 | 599E199B609C0C654DB053E8C94F343AAFF8 |
| 32 | 0 | 1 | E0187D89220D11B5F60DAC078A5E2EED6EF0 |
| 33 | 1 | 1 | 69F57E074F14A10FEC6144C26E98C4688330 |
| 34 | 2 | 1 | D2C4067132528AA41BBE61A9C171A382F768 |
| 35 | 3 | 1 | B027CB82594D3900700B541A99CCD5FD5870 |
| 36 | 4 | 1 | E9B565C61F73EC6633A1F2D96EC409495B80 |
| 37 | 5 | 1 | EBD7E29110582C5951233AB22B03DE709698 |
| 38 | 6 | 1 | 0CCA91DA1B42B0B55C924F32B08B1FAE0E18 |
| 39 | 7 | 1 | A4213FFB85B56E27C74FC6ECBA359875438C |
| 40 | 8 | 1 | 1A37F92589686CFE5E4D4BFD8E2BC63AA8CC |
| 41 | 9 | 1 | 31531C7B2F7518BF59ACFB216FC74D09F2F4 |
| 42 | 10 | 1 | CE026112DF00BB74E1B1F43B595112B16344 |
| 43 | 11 | 1 | 503494DE054AE395883AEDD8CC7801B8F124 |
| 44 | 12 | 1 | 8447E25CA9A0EE1CFB9FADB6C42B8F565B3C |
| 45 | 13 | 1 | 757C45DA8F140FB6E71024294B2439CDACFC |
| 46 | 14 | 1 | F2A59A32B51CE505E45E9B5C7C7DBE880DF4 |
| 47 | 15 | 1 | 8DFBF09479BC91E466A539E077D2B26A8B2C |
| 48 | 16 | 1 | 1C6FB87D76DB82FFA1E492166684CACEE560 |
| 49 | 17 | 1 | A32CF584137FDF1D4CCE6A1CF40FEC1F4AE0 |
| 50 | 18 | 1 | EC4D3AC52136FA468F28777078C8A82C0808 |
| 51 | 19 | 1 | 30CABB208C9D6C774814A163765E4ACBC540 |
| 52 | 20 | 1 | CA3448C6716F6F8D15D7372A3A4F6E825A14 |
| 53 | 21 | 1 | ABD1526F4A510F820B689F30C1E7B88C8848 |
| 54 | 22 | 1 | 94E4E2AE2C4E47FD7D0A154C25BF40F759E0 |
| 55 | 23 | 1 | 43BFFD566D85BE162650670BE1A3CA523284 |
| 56 | 24 | 1 | D7644475A2E5EDAD1AD184242E3C841A03E0 |
| 57 | 25 | 1 | A61DDBA416D1D14358647C4ACEF2503001E4 |
| 58 | 26 | 1 | 1F9047A8651D4D4A7C582469DC8C41B68E08 |
| 59 | 27 | 1 | E0EAC02D975263F36D4BEF70669CBDEE658C |
| 60 | 28 | 1 | DFAE7334BD2B8FF1D2C7CB5922823B03F744 |
| 61 | 29 | 1 | D44B2AD5842F1EEA1A39DBC64EC064FCCFBC |
| 62 | 30 | 1 | 08AD296C8D17ABD021E02E20DACC247673EC |
| 63 | 31 | 1 | 2FE66830D806B3F8DD38D5FE1CF12DEB9774 |
| 64 | 0 | 2 | C6325F42597BD48A8914944C7DB973D83E64 |
| 65 | 1 | 2 | E04B98E9254434D3F765A621752C0F1FEC54 |
| 66 | 2 | 2 | A74B60D84CCB156B1B8AE015B8CE980868EC |
| 67 | 3 | 2 | 78E7405DCFDA1DFCDA6E54B3794B49A0F8B0 |
| 68 | 4 | 2 | F32F4CA1A154E746FE1C2D1E4A1251779804 |
| 69 | 5 | 2 | 5A2905A1CF5D06444C880ADC07EB3889E71C |
| 70 | 6 | 2 | 74290661C664DEB829569B7C4E6C32B2BE00 |
| 71 | 7 | 2 | EBB53241F5D9CD87A612C0774ED2FED4679C |
| 72 | 8 | 2 | E33B89ABA4ED020D558B833AF74072922164 |
| 73 | 9 | 2 | 3B7D2DEEF829E230718AA7996CD814A4DD88 |
| 74 | 10 | 2 | 373861E8993FC22E176F6DA6A46A10158EF4 |
| 75 | 11 | 2 | 2BEA329B65DE1CD26ECDD382915AC40B1D0C |
| 76 | 12 | 2 | 7A8B131BD5D1270C30003DA472DD81D9A434 |
| 77 | 13 | 2 | 9D6A237940057479D30BE19AD719F8F9B47C |
| 78 | 14 | 2 | C1FB9C3811B349E9F793A14C8AE8425A6218 |
| 79 | 15 | 2 | DFFFDE03D8C717A346B4B1D3C02693330A9B4 |
| 80 | 16 | 2 | 76254DEF89683CD7210898069E2CDA0EE144 |
| 81 | 17 | 2 | 09B9B69C132C4E2DC16A1438828147D65F94 |
| 82 | 18 | 2 | B1CCE0D47DF246E9059CBC970168518206AC |
| 83 | 19 | 2 | 1017669D7990F3AB4378924C69E442F2BAD0 |
| 84 | 20 | 2 | 772407B19C5FA41D542C8A2DC9ADD2C2943C |
| 85 | 21 | 2 | 7A38C2889EB10D93F23EC75B212D327D18A8 |
| 86 | 22 | 2 | D25A195D899BF6F531F5ECC228BE0678A438 |
| 87 | 23 | 2 | A83FD1C33F4C6CAA5A0E8B062937AC310034 |
| 88 | 24 | 2 | AA6DDD1A05ADF49F615BE9F9EBCA6630E440 |
| 89 | 25 | 2 | B14990574937763EEBD71A12FEB0C673F878 |
| 90 | 26 | 2 | DDF013D74BDDE5FBB621A32B54DE24AA1D60 |
| 91 | 27 | 2 | D814295D387D2EE33F90C07CA493062B3054 |
| 92 | 28 | 2 | 89B93046231A786C3D74ABAEC6AFF42D037C |
| 93 | 29 | 2 | 5680E918BA19199E841B4D6A7D1DD1420E78 |
| 94 | 30 | 2 | 639CC821373B332F975817C0A1AC16A48150 |
| 95 | 31 | 2 | 06711D78BD8978D82DA58B7E494DDF77E994 |
| 96 | 0 | 0 | C882DD8DBD23C796A1389DA4EAA9A4138640 |
| 97 | 1 | 1 | 038086D70895496BCABC404B1EC999F67AC0 |
| 98 | 2 | 2 | 8203073A335DB9E57B0CA2F07D5958176B50 |
| 99 | 3 | 0 | 3FF1CD3638EE6469A4A482AF834EF56A2340 |
| 100 | 4 | 1 | 69EA7871159D5099F900C6133C07DABF56F0 |
| 101 | 5 | 2 | 4D88ABB17FF855393EDBC070CF0439D5E94C |
| 102 | 6 | 0 | 01EFD43C87362B00E376A728BC597BEED978 |
| 103 | 7 | 1 | 7AE20D16F3CC6F947413518FDF6E1FCCCDE8 |
| 104 | 8 | 2 | BB852F9A90B0DE260BB67F45491B31DE3A74 |
| 105 | 9 | 0 | 088627544BDF971C1AC4F86F05A212EE9634 |
| 106 | 10 | 1 | 0C8A08A37C2B9D3C1812E9C116B4E6A6285C |
| 107 | 11 | 2 | E74775CADDDDF0D2D808FE7FC1C177489284 |
| 108 | 12 | 0 | E81ECC6AC393294E9B549A8B2BADE7FFF904 |
| 109 | 13 | 1 | 1C5FAE8CACE7A2CD13CAF4A34A440E909BF8 |
| 110 | 14 | 2 | 6EE7E42A292BDACC5C79B81CA6598274C940 |
| 111 | 15 | 0 | 407547BC0C961D9E9ADDE010F4990724E8DC |
| 112 | 16 | 1 | 46CE626ACD894F9650E6B7C3F9E3BFAE5B08 |
| 113 | 17 | 2 | C59B894FBF170F44F4816750280AB8CB4E48 |

TABLE 7

Preambles modulation series for the 128 FFT mode

| Number | CellId | Segment | Series to modulate (in Hexadecimal format) |
|---|---|---|---|
| 0 | 0 | 0 | 01E52A9B3 |
| 1 | 1 | 0 | C96FF8AB1 |
| 2 | 2 | 0 | A1F5CE648 |
| 3 | 3 | 0 | 1E2BF6919 |
| 4 | 4 | 0 | 051798B72 |
| 5 | 5 | 0 | 932D7FA8E |
| 6 | 6 | 0 | 2CBD50F73 |
| 7 | 7 | 0 | F86F6A451 |
| 8 | 8 | 0 | 2BA44F7E7 |
| 9 | 9 | 0 | EEFA172C3 |
| 10 | 10 | 0 | FF46C729A |
| 11 | 11 | 0 | 0362D5C61 |
| 12 | 12 | 0 | 27DDC7CA5 |
| 13 | 13 | 0 | 17EAEDAC6 |
| 14 | 14 | 0 | 94ACD9E03 |
| 15 | 15 | 0 | 1A1AC22DD |
| 16 | 16 | 0 | FD5E18DA6 |
| 17 | 17 | 0 | 35DEB6E0E |
| 18 | 18 | 0 | A0185E326 |
| 19 | 19 | 0 | 93B3F9C75 |
| 20 | 20 | 0 | 632481EA8 |
| 21 | 21 | 0 | 8BB8104A5 |
| 22 | 22 | 0 | 87C89EF75 |
| 23 | 23 | 0 | 207AA794C |
| 24 | 24 | 0 | 6A4D1C403 |
| 25 | 25 | 0 | 7761B4BD7 |
| 26 | 26 | 0 | 31ABBF06D |
| 27 | 27 | 0 | 69C6E455F |
| 28 | 28 | 0 | AB3B3CFF0 |
| 29 | 29 | 0 | 731412685 |
| 30 | 30 | 0 | A3135C034 |
| 31 | 31 | 0 | FECCB2B85 |
| 32 | 0 | 1 | AA37BDA7C |
| 33 | 1 | 1 | 90955CE1F |
| 34 | 2 | 1 | ADBC1B844 |
| 35 | 3 | 1 | A04A3B197 |
| 36 | 4 | 1 | 015E56CB3 |
| 37 | 5 | 1 | 64D6F4038 |
| 38 | 6 | 1 | D2DD02238 |
| 39 | 7 | 1 | FEA763CB2 |
| 40 | 8 | 1 | 8CE0D5FB6 |
| 41 | 9 | 1 | CC25D7A7E |
| 42 | 10 | 1 | 7019D3A92 |
| 43 | 11 | 1 | 784CF7EAB |
| 44 | 12 | 1 | 07085DAC8 |
| 45 | 13 | 1 | 4CEEB5E1F |
| 46 | 14 | 1 | 9E5CD5B80 |
| 47 | 15 | 1 | 63A76FD05 |
| 48 | 16 | 1 | AA276F96F |
| 49 | 17 | 1 | 3370F5082 |
| 50 | 18 | 1 | 35A644170 |
| 51 | 19 | 1 | 16FD73B8B |
| 52 | 20 | 1 | EEE990E94 |
| 53 | 21 | 1 | 28A3120FC |
| 54 | 22 | 1 | C2FBC2993 |
| 55 | 23 | 1 | 880BCACD3 |
| 56 | 24 | 1 | AFA4DB918 |
| 57 | 25 | 1 | AE1E49884 |
| 58 | 26 | 1 | F7945E264 |
| 59 | 27 | 1 | 38374CA42 |
| 60 | 28 | 1 | 5AAE39B00 |
| 61 | 29 | 1 | 138069E54 |
| 62 | 30 | 1 | 966707005 |
| 63 | 31 | 1 | A5037759E |
| 64 | 0 | 2 | 3FE158D96 |
| 65 | 1 | 2 | AED3B839F |
| 66 | 2 | 2 | F5AE23268 |
| 67 | 3 | 2 | 1895E68BE |
| 68 | 4 | 2 | 1443C94EC |
| 69 | 5 | 2 | 929547307 |
| 70 | 6 | 2 | A17D3230C |
| 71 | 7 | 2 | D54FC0C33 |
| 72 | 8 | 2 | AB77F079C |
| 73 | 9 | 2 | C3CA00A66 |
| 74 | 10 | 2 | 025519879 |
| 75 | 11 | 2 | 6CF39F815 |
| 76 | 12 | 2 | F69E451B1 |
| 77 | 13 | 2 | 91BC72EBF |
| 78 | 14 | 2 | F964A5447 |
| 79 | 15 | 2 | F8CD36F4A |
| 80 | 16 | 2 | 726A3C802 |
| 81 | 17 | 2 | 118D1B682 |
| 82 | 18 | 2 | DED9E703A |
| 83 | 19 | 2 | 3E8929773 |
| 84 | 20 | 2 | 2C64AA7F9 |
| 85 | 21 | 2 | 2249CEA0F |
| 86 | 22 | 2 | 01363A94E |
| 87 | 23 | 2 | 69D77721F |
| 88 | 24 | 2 | AE103C9B9 |
| 89 | 25 | 2 | 89E2A6940 |
| 90 | 26 | 2 | A7BC42645 |
| 91 | 27 | 2 | BBB6B9C0F |
| 92 | 28 | 2 | 5BF7598F8 |
| 93 | 29 | 2 | 4AE4C79FE |
| 94 | 30 | 2 | 1FDC748C9 |
| 95 | 31 | 2 | 877D5E6E4 |
| 96 | 0 | 0 | 0FE322452 |
| 97 | 1 | 1 | 4DC778B5F |
| 98 | 2 | 2 | ADD9E3F88 |
| 99 | 3 | 0 | 2C1C857DC |
| 100 | 4 | 1 | CFB4B5503 |
| 101 | 5 | 2 | CD8505E21 |
| 102 | 6 | 0 | 82892F4CE |
| 103 | 7 | 1 | 3979FD176 |
| 104 | 8 | 2 | 5FA49C311 |
| 105 | 9 | 0 | BA7857B19 |
| 106 | 10 | 1 | BC030C4CA |
| 107 | 11 | 2 | 517F3CBD6 |
| 108 | 12 | 0 | 7E545BE73 |
| 109 | 13 | 1 | DDCA69C3F |
| 110 | 14 | 2 | A01A2C8C7 |
| 111 | 15 | 0 | 1C0B64435 |
| 112 | 16 | 1 | 330282DF2 |
| 113 | 17 | 2 | 147FCCF4B |

Table 6 illustrates another embodiment of a preambles modulation series per segment and Cellid, for the 512 FFT mode.

Suggested title: Table 307c, if included in the IEEE Standard.

Table 7 illustrates another embodiment of a preambles modulation series per segment and Cellid, for the 128 FFT mode.

Suggested title: Table 307d, if included in the IEEE Standard.

Preamble properties: the preambles were chosen using a computer search which minimizes the PAPR and cross-correlation properties (or a coherent/slow or differential/fast cell search).

The graphs in FIGS. 1 to 6 illustrate these properties.

Figure 8:
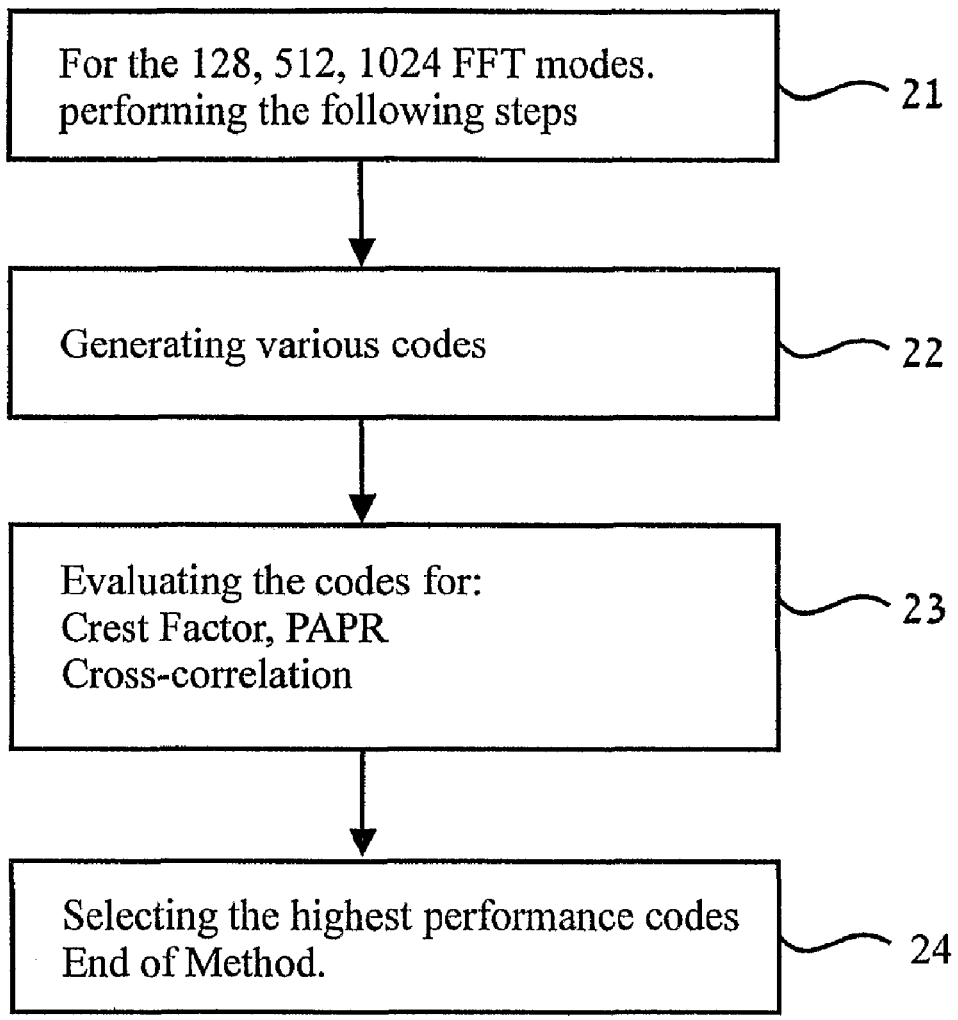
FIG. 8 details a method for computing improved performance preamble codes.

The following method may be used to compute codes such as those presented in this disclosure, see FIG. 8.

Figure 7:
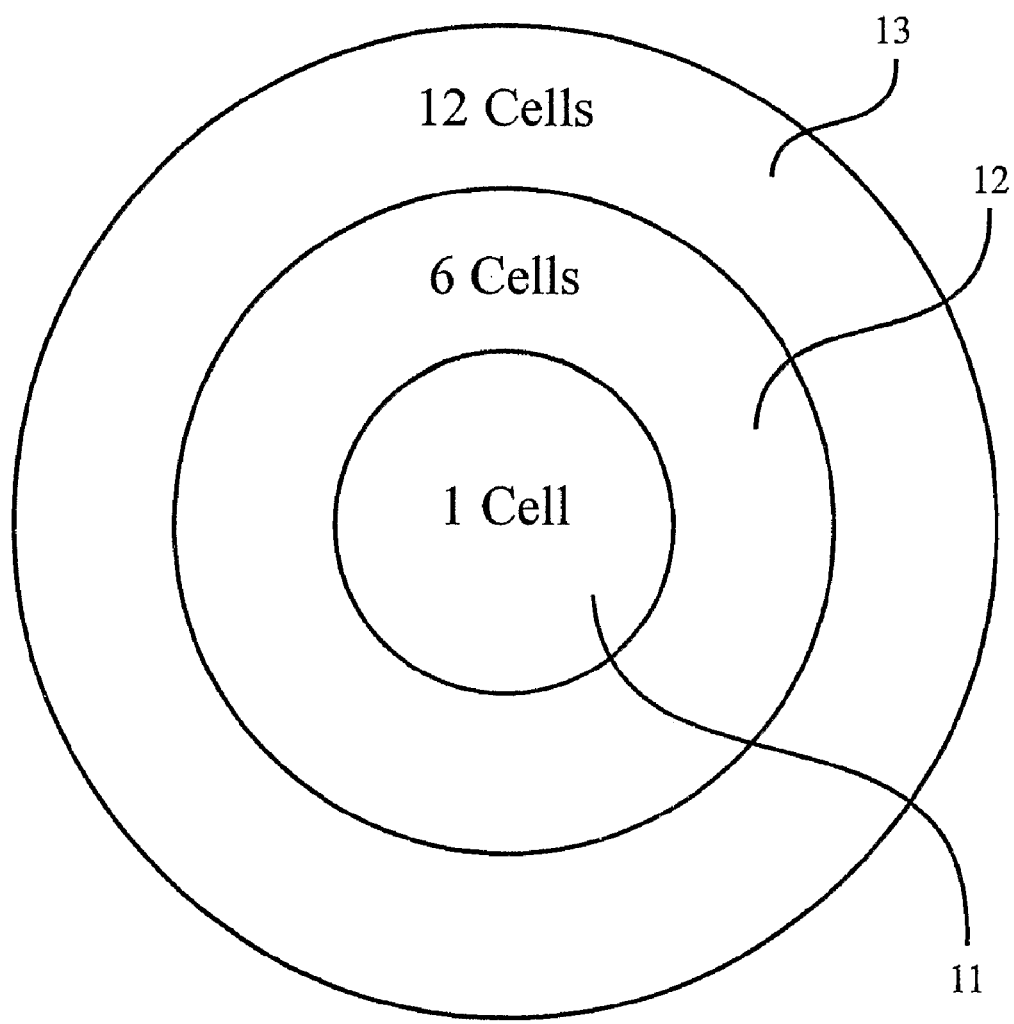

To evaluate the performance of each code, a cellular model was used, see FIG. 7, which includes a first cell 11 surrounded by a first tier 12 of 6 cells and a second tier 13 of 12 cells, 19 cells in total.

Each cell may have three sectors separated in frequency, groups F1, F2 and F3; in another embodiment, the cells may have six sectors each.

F1, F2, F3 each may refer to an orthogonal set of subcarriers.

For a group of 19 cells with 6 segments each, the total number is 19×6=144

We are looking for a randomizer that will achieve best performance from the aspects of Crest Factor/PAPR and/or Cross-correlation, for the above possible scenarios.

The various codes generated as detailed below have been evaluated with reference to the above model, see also FIG. 7.
Method for Codes Generation
1. For each of the FFT modes: 128, 512, 1024, performing the following steps (2-4) [21]:
2. Generating various codes, pseudo-random simulation [22]
3. Codes evaluation in a predefined model, including a wireless cell, a first tier including 6 cells and a second tier including 12 cells, 19 cells in total [23].
  Compute Crest Factor, PAPR
  Compute Cross-correlation among codes
4. Selecting the highest performance codes according to predefined criteria in PAPR and/or Cross-correlation [24]
End of Method.

INDUSTRIAL APPLICABILITY

The present invention refers to improvements in wireless communications. It describes improved preamble codes having a lower PAPR value.

A lower PAPR allows to boost the preamble to get better performance in the estimation/acquisition/cell monitoring, etc.

The present disclosure includes improvements in the 1024, 512 and 128 FFT OFDMA modes.

Tables with series to modulate, for different FFT sizes, are disclosed in the present application.

It will be recognized that the foregoing is but one example of an apparatus and method within the scope of the present invention and that various modifications will occur to those skilled in the art upon reading the disclosure set forth hereinbefore.

The invention claimed is:

1. A method of transmitting data with a preamble code usable in Orthogonal Frequency Division Multiple Access (OFDMA) for the physical layer (PHY), comprising:
  selecting an appropriate table of code sequences having improved code performance for selecting preamble codes suitable for 1024, 512 or 128 FFT OFDMA transmission mode, the appropriate pseudo-random codes for achieving an improved PAPR;
  generating, by a communication system, pilots for the OFDMA transmission mode;
  modulating the pilots with the selected preamble codes, by the communication system; and
  transmitting the modulated pilots over an OFDMA channel, by the communication system.

2. The method of claim 1, wherein for a 1024 FFT OFDMA transmission mode selecting the preamble codes comprises selecting the pseudo-random codes in the following table:

| Number | CellId | Segment | Series to modulate (in Hexadecimal format) |
|---|---|---|---|
| 0 | 0 | 0 | A6F294537B285E1844677D133E4D53CCB1F182DE00489E53E6B6E77065C7EE7D0ADBEAF |
| 1 | 1 | 0 | 668321CBBE7F462E6C2A07E8BBDA2C7F7946D5F69E35AC8ACF7D64AB4A33C467001F3B2 |
| 2 | 2 | 0 | 1C75D30B2DF72CEC9117A0BD8EAF8E0502461FC07456AC906ADE03E9B5AB5E1D3F98C6E |
| 3 | 3 | 0 | 5F9A2E5CA7CC69A5227104FB1CC2262809F3B10D0542B9BDFDA4A73A7046096DF0E8D3D |
| 4 | 4 | 0 | 82F8A0AB918138D84BB86224F6C342D81BC8BFE791CA9EB54096159D672E91C6E13032F |
| 5 | 5 | 0 | EE27E59B84CCF15BB1565EF90D478CD2C49EE8A70DE368EED7C9420B0C6FFAF9AF035FC |
| 6 | 6 | 0 | C1DF5AE28D1CA6A8917BCDAF4E73BD93F931C44F93C3F12F0132FB643EFD5885C8B2BCB |
| 7 | 7 | 0 | FCA36CCCF7F3E0602696DF745A68DB948C57DFA9575BEA1F05725C42155898F0A63A248 |
| 8 | 8 | 0 | 024B0718DE6474473A08C8B151AED124798F15D1FFCCD0DE574C5D2C52A42EEF858DBA5 |
| 9 | 9 | 0 | D4EBFCC3F5A0332BEA5B309ACB04685B8D1BB4CB49F9251461B4ABA255897148F0FF238 |
| 10 | 10 | 0 | EEA213F429EB926D1BDEC03ABB67D1DE47B4738F3E929854F83D18B216095E6F546DADE |
| 11 | 11 | 0 | C03036FA9F253045DF6C0889A8B83BAEFCF90EB993C2D79BD911CA84075061AA43DA471 |
| 12 | 12 | 0 | 1E68EC22E5E2947FB0A29E4CC70597254B36C60331EACF779FE752D3F55DC41ABFC7DC9 |
| 13 | 13 | 0 | 63A57E75A0434F035AAC4504B265081D497F10C77928B71797C5D6C6824DC0F23BE34EE |
| 14 | 14 | 0 | C57C4612816DE981C58FD6F8DE9DD41F2422ADBC522B0CE31F9A6D5F2A126DC08F69FB1 |
| 15 | 15 | 0 | 978256AF184E7ED17789B33D324C711B36BFBCCE5446EB03687E9A0A839C7CE156104D2 |
| 16 | 16 | 0 | 011EC823157DD73150640CEB7DDB0A1F8F91E09599A851D5C7CAF687CFB752D297D82FC |
| 17 | 17 | 0 | C6DE82BEB7F57B9120E8A376D85C8F70FDC65BC660402DAC4AE6002EA2740C4F9E5973C |
| 18 | 18 | 0 | 4C74929D6F9FAB9E5BB761026038E076F6824295E0AF397806ECEBC6DC713F03ACDC27C |
| 19 | 19 | 0 | 596F18F3D454D581BBC0A414F43B595E270AD5E5AA3D4CE6BF4860093EA13B271934344 |
| 20 | 20 | 0 | 13E1E85C2234D0F3418001A35F135E10C6C918C36BC659FDA9D655D288A0BDAA8BF489D |

-continued

| Number | CellId | Segment | Series to modulate (in Hexadecimal format) |
|---|---|---|---|
| 21 | 21 | 0 | FD4AF2D8F4F08F1A7DF59291C9AEE788F641B8231CFB8 13376E0BEB68DFCFCBBE552445 |
| 22 | 22 | 0 | 315E59049D478B0ADB32740B583DFE465F76B1F2021D0F 5829B34A09EB1D85E0531082E |
| 23 | 23 | 0 | EBBC77A493AA0C62C62F25EE5E8D0701F50386F49026F A31487C9FD5C5206CE4EB00576 |
| 24 | 24 | 0 | 134F936F9E875842587ADCA92187F2FC6D62FFC3A833D8 CDE465F9972ABAA83763AAEB7 |
| 25 | 25 | 0 | 3CD1DA70670BC73363D1B4A66D280FF6AA7636D07ECF 32BA26101E5EBA1594FB8A0420A |
| 26 | 26 | 0 | 918296B2937C2B6F73CF98F85A81B723D1C69DBDF3E019 749C582DA22E789562729D475 |
| 27 | 27 | 0 | C323981B8B2240865F48D61AE1B3B61D88522B7358952F9 49D4308CA15D1EE8FDFA683F |
| 28 | 28 | 0 | 7514A6FA5FBB250C5C8CE96F791D676036C344A44B2428 4477B44CB3E758F8BCD58F05B |
| 29 | 29 | 0 | 84C7FEC6E977FA1EC0C7CC9E0D067C73D8F846F82ABB 3456D2104E1448D5A58D5975152 |
| 30 | 30 | 0 | A0028A7F873AF31DFF45970F51E477346CF8EDD9EFE076 94DCCDD6DAEC32694A1176D68 |
| 31 | 31 | 0 | 4841AFC277B86A0E067AF319422F501C87ACBFBDD66BF EA3644F879AE98BA8C5D605123 |
| 32 | 0 | 1 | F35EA87318E459138A2CE69169AD5FD9F30B62DA04ED2 1320A9F59893F0D176752152FD |
| 33 | 1 | 1 | A0C5F35C5971CD3DC55D7D2B9FD27AA17A198583F580 EB0800744EE5B6B3648DEA95840 |
| 34 | 2 | 1 | A6D3D33AD9B56862DBF076E3ACE6A3150510CCC8BE77 DE4E6E10EB5FE163765647D07DF |
| 35 | 3 | 1 | F335D714EDB2251A374746686EBBB485AF9A13C0F45324 AE7D73A8C2016FE1A7C24A052 |
| 36 | 4 | 1 | 3B841526CCF9D4E1BB79E45E83F69A523A006B02BFCAC 95594F4DDCB95705ADEBCF365F |
| 37 | 5 | 1 | 52849D8F020EA6583032917F36E8B62DFD18AD4D77A7D 2D8EC2D4F20CC0C75B7D4DF708 |
| 38 | 6 | 1 | 8E353EC8162F5BB6947F1843C84FE4114616B8CAA45BE4 BF718899D818B5B4074FCDB4F |
| 39 | 7 | 1 | CC53A152209DEC7E61A06195E3FA633076F7AE1BAFFE8 3CE565087C0507BA596E0BD990 |
| 40 | 8 | 1 | 17D98A7E32CCA9B142FE32DB37B2BF726E25AA7A557F FB5C400B47A38B16CF18E1EDE63 |
| 41 | 9 | 1 | 5B0B7631EFE3FFE1B558E7619DB8DD71D40E6CD6E4D5 517C8FACD20B6A9B85CCBC340CB |
| 42 | 10 | 1 | 2B08F06EEB736C84585AAC5BF912A249BD2109F841F441 68E0D2971841976D0E28FCDEB |
| 43 | 11 | 1 | D3AA20EF175DF3BD96D638D6797A8AA4DE51A9104464 65736E4D7953C8D50AD3D7A0096 |
| 44 | 12 | 1 | A5BA8C7E2C795C9F84EBBD425992766BDE5549A7A9F7 EF7E44AFD941C6084568638FE84 |
| 45 | 13 | 1 | 33E57E78A5696255CA61AE36027036DA619E493A0A8F95 D9915C6E61F3006CB9706BEBA |
| 46 | 14 | 1 | 09961E7309A9B7F3929C370C51910EBAB1B4F409FA976A E8679F354C84C4051F371F902 |
| 47 | 15 | 1 | 508A9EBAEF3C7E09CFCFC0B6F444A09B45A130EFC8C5 B22BCE87213854E7C9D329C9ADC |
| 48 | 16 | 1 | FBCD16253DF81FDC86F726AAAF4F33EE771489281A641 84F3A929BD230A2D6AE4EC9E1C |
| 49 | 17 | 1 | AACEEF9BCDC82E4AD525185B07CBABCB74861D16F7C 25CFBA917B05463AD65391AF840D |
| 50 | 18 | 1 | 23060ACC5A125DAB207EEEE47B4EEE1E8466BD17DDA 2EB3CD90D2AB7A758C213E6D7FE5 |
| 51 | 19 | 1 | CA55521667BDA8B6F1B20520151B3A0C05DE9EA06BC 73268730A81A992777021F46055 |
| 52 | 20 | 1 | 05ADFCA2F8207DC6FF8D1A85A1DD4694D4C48A838C4F 833C532710021AC448A7B62B8DD |
| 53 | 21 | 1 | EDB5D94052CF0D9A573078FB0EEDAB142ECA77547E04 E91C6A0037B2110924BCAD8F359 |
| 54 | 22 | 1 | 218C951223D7B712DC98F8B5217388A830003C5F2A00F2 32DD3475D2FC78C25B8D88FF9 |
| 55 | 23 | 1 | 79B94D24D721121EF678B7156F8D2666DE712BBF3837C8 5A9518781903146A7B4D42A28 |
| 56 | 24 | 1 | 58AABEF6A6BDE4011CAC583C5104B2C6FC5A2980F856 373E5931A3C690245327581FA13 |
| 57 | 25 | 1 | 429492DBCFE43A1B8C8037433003543CA2CF03035D13B A70BD773C6117D92E1B0446C9D |
| 58 | 26 | 1 | 427D1AD18E338E16FCE6E23B4AD6D82A2144D53048F26 65AA94577AFABD26889FCB1F9F |
| 59 | 27 | 1 | 337FE0E4C15A22471AE0F6B6F91161A7DE2E1403D73587 D5C8355105D2F70642B2CE425 |

-continued

| Number | CellId | Segment | Series to modulate (in Hexadecimal format) |
|---|---|---|---|
| 60 | 28 | 1 | CC78DB7CAE28F42C00E9C857082C7BFA276386FDE9053 73D1E99DFC52D7C23520BECE2D |
| 61 | 29 | 1 | 499FDB04EACA4BF7C9D956DC26E57A9AC636861AE955 7F39792D1D70D0034067A9F4E73 |
| 62 | 30 | 1 | A3FCAA311B536AC9DB39FED9F4E996506B3181C58D6B 7E04157A3FD463F60468765BCFD |
| 63 | 31 | 1 | F484FD1F57F53A4A749B86148E0B1D0653667CE13931988 75DDB0AE9179BBBDAAD53A11 |
| 64 | 0 | 2 | 29F529BD5762F27ACD3A0836AC6C8953951C04C67B92F 05919F382C811D4C0EF9C01488 |
| 65 | 1 | 2 | A3E9ECF1E6048562BC89DB6168E708855F0D4AD29F859 EF36C9160DF407D85426233632 |
| 66 | 2 | 2 | 890519376D1FFAA2894EABCD6663B0A3C2411982C17B0 1270E0FB0B289D4BC8C3B83DA9 |
| 67 | 3 | 2 | 54FD243CC4DAA9B8E4D47F2DE45605D6EF2C17259CD1 0EF9EBC7B92F7F7299129080C75 |
| 68 | 4 | 2 | BAC53AA6F0291E10E2CE9B52D22B682637B1F5501531B 7F1EE6A649E2404196A028ED10 |
| 69 | 5 | 2 | 2C41D56E693B529AFC883E79ABE6B829201F132E6261A0 1973B4225CEE7116CEDADB2F2 |
| 70 | 6 | 2 | 09847B6187BB5F6F6728B4ED610088FAD9DADFC00748E 9DCD8A0CE320D6C991654ABE05 |
| 71 | 7 | 2 | 91425CEE8F1DFD79EF572F9C66CB60BD4757E0519F1336 84B5A2F4E3E266532584DBEEE |
| 72 | 8 | 2 | 3285AE0A3D196313659C37BE1C94D61D20F11FD49D9FD F9D1026FF5763F02CB78AE135C |
| 73 | 9 | 2 | 0069D3F34D0D455AFB45FEFDF716333B785C6BDA90DA 23F1CC68BC6A1DBC916C595DA3E |
| 74 | 10 | 2 | AA977A8BCA39381E7C35A1ACC7C4F60421C0862BFD61 06C7C025B0676EA0EF68972DD8F |
| 75 | 11 | 2 | F310745C497094ABE56E0490C0800319DBE290553E696B6 859635AF03B121F79D925D19 |
| 76 | 12 | 2 | 964DFD350B9C7DFDC7F6F7C43283A76F0D613E48A5520 D1DAF761C6F47E389B43A023F5 |
| 77 | 13 | 2 | 8102E980BC69C2C3BE45452169DCA6C45C21B2A6DF69B 12731FEF06399EA130752CF567 |
| 78 | 14 | 2 | 6D767B88D28A455CC3B56C942BAFD8E465A50FD2C22F E6162E03A9AAC3C1CC899800610 |
| 79 | 15 | 2 | C5491C6CA3D998906EC1482F815B74B7C2E3816B682AC C6009AB7EFF34BF0E9CE59C754 |
| 80 | 16 | 2 | 237DB73895531253E3D7A62F485FD5D8ECAE11BE29E10 22DF659CB39A3C44120C5A0731 |
| 81 | 17 | 2 | 6D8EE32D30E19D93A0E5AD8226BAE9CF6FCBA17CF6E 67FDC5A15A81ECB8908BEDD77C80 |
| 82 | 18 | 2 | A1A67B19CD5E80A7C1DE5780D1E594990482AA96DA82 C64AE51AB7EF3857A8F0B162888 |
| 83 | 19 | 2 | 98F8BFDF774C7A249418E6FF4723D6E6AB2F091CDE4DE 10E11D3BD463B509FB716940FD |
| 84 | 20 | 2 | 8E5AB6F13AAC09CA5854781ACA774F68238387806AD6C CC13EEF92B267F7FC576542AF1 |
| 85 | 21 | 2 | 477F8BD8905FDBF55191FC82D674094E080B539C743C19 C1064E6CA37CE692F52CB8164 |
| 86 | 22 | 2 | 7AFF110DBC3B44E4CA6054768146ABFAFFBB0862A196 D69A972FC318D922F620EA0F345 |
| 87 | 23 | 2 | 65300BAD8FFA21BC7DC2C1F79FA97A9F469CCC9E270A 61759F34D6276F57CBEB009CD21 |
| 88 | 24 | 2 | F51AB5A322B4FA8C8DA65D96582C575ECDF96FCAF41D DE3A84AF8663CF4141888FEC269 |
| 89 | 25 | 2 | 6F36BB6D5A7DC4FB720439E91FF0DE86DD6C4B93CFC4 271F2BCC6169616E3AEAA19E360 |
| 90 | 26 | 2 | 1A4186FD2DE2B2B5FFA3A96DD0AF4673026FFE4F14551 754CB2FE35E634F27A4CC7931B |
| 91 | 27 | 2 | 7B6FF9A8738324CBB48BBD575ABD339B581FE16742526 E2A62A2D8D030B8712B2488DEF |
| 92 | 28 | 2 | D318414132A10423E99D0D952BCE250F93056CFDD86E0 AC2839CFC816F195DACF581F30 |
| 93 | 29 | 2 | D056262D32B6B5C75D06411B5C3AB93B94FF48DDF9523 127F74104B873AE1114B60BF3E |
| 94 | 30 | 2 | D27B00C70A8AA2C036ADD4E99D047A376B363FEDC287 B8FD1A7794818C5873ECD0D3D56 |
| 95 | 31 | 2 | E7FDDCEED8D31B2C0752D976DE92BEA241A713CF818 C274AA1C2E3862C7EB7023AF35D4 |
| 96 | 0 | 0 | 0D26B8D5452948E30FD29D36E8404C8456657A6CBEEFC D91BB14F91E291F2C1C8F4119F |
| 97 | 1 | 1 | 2CC0EEF167D75102669A814D11A51E569D07A7433A9762 A292D7E2A4FE35B9130FD67DE |
| 98 | 2 | 2 | FB5CBD0CB6FA80C8B3560B4C443BA4900BF2729B16009 8C2F783A7752B8BA235010A1DA |

-continued

| Number | CellId | Segment | Series to modulate (in Hexadecimal format) |
|---|---|---|---|
| 99 | 3 | 0 | 87BF4954022D30549DF7348477EACB97AC3565B838460C C62F242883313B15C31370335 |
| 100 | 4 | 1 | 076BF72542FB9FEBDEC3C316BC28CF0607BCEC5399EC9 228905375D3D15F929B586D7E6 |
| 101 | 5 | 2 | 82DD830BEDE4F13C76E4CF9AEF5E42609F0BDDCB000A 742B6372DD5225B0C3114494746 |
| 102 | 6 | 0 | 4E06E4CF46E1F5691938D7F40179D8F79A85216775384BD 97966DB4BBF49FB6FAB8F945 |
| 103 | 7 | 1 | 8A842EF53464D03A34EE088E38118CB89F79035272B8ED 06C8E13A16B34FBFC5BF9CDA4 |
| 104 | 8 | 2 | 43380948BFA0642029561E309F371E153174A4E7AC511F8 861BE87D9F4D9246C93C2A92 |
| 105 | 9 | 0 | 32DE5121E785059F81D9A777565C51EFBB4F61B77ED088 70652A4DC32DEA58A8CC6F456 |
| 106 | 10 | 1 | 64164534569A5E670FDB390D09C04802DD6A16B022CAD C77EDD7464AFED43C773A8DC76 |
| 107 | 11 | 2 | FB8769A81AA9DB607F14A6A95948401F83057CDC9C9C3 996BA5821403A49F00A4E35191 |
| 108 | 12 | 0 | 77710D6F40B4F79CC63F678551C3EC18FA9DF2C82E6C8 F415DADFD63264B7513180070E |
| 109 | 13 | 1 | 3843D2B038045CB9C516B325BC0E242311ACFA807FDC4 0A8AD259B77F376C931A6F6AF0 |
| 110 | 14 | 2 | 503F196BBF93C238BFD5E735E5AE52E0DAE64F5E2F4C3 B92E553F51303C4A64C4403BF3 |
| 111 | 15 | 0 | CA346FCCF511822F524C043D2003F3B12DCFEA276B91B A98EB3984BBCFDF75C2A2E1B27 |
| 112 | 16 | 1 | 5FD4A68945666678C95B9D5A59DDE5366799045FEB03A2 BAA74094140E9068C61C2E972C |
| 113 | 17 | 2 | E68AE62D2EE51B14F9D33ED737253CDB55A6E27725405 0830F2FE409E5EE284534FC3E5. |

3. The method of claim 1, for a 512 FFT OFDMA transmission mode selecting the preamble codes comprise selecting the pseudo-random codes in the following table:

| | | | |
|---|---|---|---|
| 0 | 0 | 0 | 66C9CB4D1C8F31D60F5795886EE02FFF6BE4 |
| 1 | 1 | 0 | D8C30DA58B5ED71056C5D79032B80E05522C |
| 2 | 2 | 0 | 8EB62664E3B2C5222DE18E9000561F25AAFC |
| 3 | 3 | 0 | 3B32299087C257CD31C67E4AA5DD697B0E08 |
| 4 | 4 | 0 | 3B32299087C257CD31C67E4AA5DD697B0E08 |
| 5 | 5 | 0 | C07E0B0C5DB44071EE6CEC40CA3135CB5DB8 |
| 6 | 6 | 0 | C07E0B0C5DB44071EE6CEC40CA3135CB5DB8 |
| 7 | 7 | 0 | 89B08CD299A8AC757DB59107AF4E1EF1EE1C |
| 8 | 8 | 0 | 1B72E8C0ECFAABF050091382B411B45A718C |
| 9 | 9 | 0 | 5B33ED5A6303397EC3CCC35C8203A5A05178 |
| 10 | 10 | 0 | AD1173C461254BF9181238319F93F86AF964 |
| 11 | 11 | 0 | 2662789A0B78BA5EDEB403CE5D62A802D50C |
| 12 | 12 | 0 | 51E2005BBA69C858BCC741D84990B657271C |
| 13 | 13 | 0 | 21A03B607DD96F270CBC759B2A9BD6A68A34 |
| 14 | 14 | 0 | 4518EC4C7AD645D24AD949B42A7881403C7C |
| 15 | 15 | 0 | F8B70C595A37315D301D378A4D2848C821D4 |
| 16 | 16 | 0 | 487DD10C5F24C1A9AFD9D8F442B073446480 |
| 17 | 17 | 0 | F8B70C595A37315D301D378A4D2848C821D4 |
| 18 | 18 | 0 | FF42582005F8382C5CC6298D757155B36B24 |
| 19 | 19 | 0 | 599EF40107CBB3B30AF945365494A0D60570 |
| 20 | 20 | 0 | C6D6BE87F0D88458ABD22DE822B64E450738 |
| 21 | 21 | 0 | 5D4D86E62D6B3CA63F76C85AE79F14217408 |
| 22 | 22 | 0 | E043896829F236B10A35014D9E4F26ECB95C |
| 23 | 23 | 0 | 2347472A610FC084C71460393AEF36CBE928 |
| 24 | 24 | 0 | 5F4D880DC516DC0B3860DA948225D2BC6770 |
| 25 | 25 | 0 | 9EFEEA99631FAF0D9589E9640BCD56C5FF08 |
| 26 | 26 | 0 | 9EFEEA99631FAF0D9589E9640BCD56C5FF08 |
| 27 | 27 | 0 | FE792EF83B235B3D4A6447BED27035454BC0 |
| 28 | 28 | 0 | B3B1B868C121C4555A64161B654A4FE81D70 |
| 29 | 29 | 0 | 476EA99AF9F73D018EB649F2EE789CE0B4EC |
| 30 | 30 | 0 | B7C2D44078510ADD2447D93E8A1231AE3910 |
| 31 | 31 | 0 | 16A9D8F71CC1CD0EFA0008AA343A7A4ADA4C |
| 32 | 0 | 1 | 2815DA9666DFBCCFAEEA82F965B70E06F42C |
| 33 | 1 | 1 | 7389FDE96166E7E40F7A6778AA02944937A4 |
| 34 | 2 | 1 | 7389FDE96166E7E40F7A6778AA02944937A4 |
| 35 | 3 | 1 | A0598A0907798B3465DD8CBD08565F0FB5B8 |
| 36 | 4 | 1 | 0E75B3C128085C954A25E5808FC5833A8FB0 |
| 37 | 5 | 1 | BBCDA362265B4D4D2BEE80F635E638316280 |
| 38 | 6 | 1 | 660047B06A1B5FAE6A9F0679DBCA9B1A2DF4 |
| 39 | 7 | 1 | 117773F464DFB00EC570DB2C8546B534A388 |
| 40 | 8 | 1 | 2594AE119CB87E802D67EF7EE0EAE99474CC |
| 41 | 9 | 1 | 2594AE119CB87E802D67EF7EE0EAE99474CC |
| 42 | 10 | 1 | 86823FCCBA812BF28F4EF65732E938361484 |
| 43 | 11 | 1 | 8800AECA9BF4C9CB5B4A32D950E1B8FC8740 |
| 44 | 12 | 1 | 8FB3FA462D2CFAF842BB5319D9786A997C10 |
| 45 | 13 | 1 | 8FB3FA462D2CFAF842BB5319D9786A997C10 |
| 46 | 14 | 1 | 599E199B609C0C654DB053E8C94F343AAFF8 |
| 47 | 15 | 1 | E0187D89220D11B5F60DAC078A5E2EED6EF0 |
| 48 | 16 | 1 | E0187D89220D11B5F60DAC078A5E2EED6EF0 |
| 49 | 17 | 1 | B71B524A36024F5B93F827D59DE7DF2238F8 |
| 50 | 18 | 1 | 304CD86DFE201256227046C3D0AE7D5F51CC |
| 51 | 19 | 1 | D2D899FBB154C422F25F218E432E483AE7A0 |
| 52 | 20 | 1 | CB766885201284B65C6460F29AAE9411BF18 |
| 53 | 21 | 1 | 69F57E074F14A10FEC6144C26E98C4688330 |
| 54 | 22 | 1 | 24C5314B4FC521470F94DFE0F72AB8DB1910 |
| 55 | 23 | 1 | 6E4E07CC03CD3E0BDEEAB58975B4CA8E777C |
| 56 | 24 | 1 | D2C4067132528AA41BBE61A9C171A382F768 |
| 57 | 25 | 1 | B027CB82594D3900700B541A99CCD5FD5870 |
| 58 | 26 | 1 | 24C5314B4FC521470F94DFE0F72AB8DB1910 |
| 59 | 27 | 1 | 76A0B07A726FB16B905A4678708759042288 |
| 60 | 28 | 1 | E9B565C61F73EC6633A1F2D96EC409495B80 |
| 61 | 29 | 1 | E9B565C61F73EC6633A1F2D96EC409495B80 |
| 62 | 30 | 1 | EBD7E29110582C5951233AB22B03DE709698 |
| 63 | 31 | 1 | 0CCA91DA1B42B0B55C924F32B08B1FAE0E18 |
| 64 | 0 | 2 | 60F073332D4EE53CC709FFF645F545AA0348 |
| 65 | 1 | 2 | 928E1442069F540326E72775785C2788D3A4 |
| 66 | 2 | 2 | 928E1442069F540326E72775785C2788D3A4 |
| 67 | 3 | 2 | 5633AC03D79BE3901A79E1FFAF65B3756448 |
| 68 | 4 | 2 | 0F93A3C4ED837D800637B5F52FB1D73B9A68 |
| 69 | 5 | 2 | F110CE0220306AD14EECEC07AC36EB28725C |
| 70 | 6 | 2 | A4213FFB85B56E27C74FC6ECBA359875438C |
| 71 | 7 | 2 | 1A37F92589686CFE5E4D4BFD8E2BC63AA8CC |
| 72 | 8 | 2 | 1A37F92589686CFE5E4D4BFD8E2BC63AA8CC |
| 73 | 9 | 2 | 31531C7B2F7518BF59ACFB216FC74D09F2F4 |
| 74 | 10 | 2 | CE026112DF00BB74E1B1F43B595112B16344 |
| 75 | 11 | 2 | 503494DE054AE395883AEDD8CC7801B8F124 |
| 76 | 12 | 2 | 503494DE054AE395883AEDD8CC7801B8F124 |
| 77 | 13 | 2 | 261EAF7C9AFAB5109DEC8A968A79F90F10CC |
| 78 | 14 | 2 | 234AEE2720BAF6D7C7D6B9E628177243EC98 |
| 79 | 15 | 2 | 8447E25CA9A0EE1CFB9FADB6C42B8F565B3C |

-continued

| | | | |
|---|---|---|---|
| 80 | 16 | 2 | 8447E25CA9A0EE1CFB9FADB6C42B8F565B3C |
| 81 | 17 | 2 | E571539289316AB94B6DF923124F5F91CF34 |
| 82 | 18 | 2 | 757C45DA8F140FB6E71024294B2439CDACFC |
| 83 | 19 | 2 | F2A59A32B510E505E45E9B5C7C7DBE880DF4 |
| 84 | 20 | 2 | 06EA6FE59D24AFFF1A789F068ACE32B76A54 |
| 85 | 21 | 2 | FBDD67D1E2F87744FA17E6821AD8D8D3A528 |
| 86 | 22 | 2 | DCC89E78138BAFE47555B6F97128D4F394A4 |
| 87 | 23 | 2 | 34DFF9E83D74050A72C61908EC53E8C0CC88 |
| 88 | 24 | 2 | 8DFBF09479BC91E466A539E077D2B26A8B2C |
| 89 | 25 | 2 | BE4DEB5A007D6B39A0CA0611C323A7A6716C |
| 90 | 26 | 2 | 38BCA168FED54EEF63E858444D0CB936C108 |
| 91 | 27 | 2 | 15CA281F8FC9BFBF340FAC8EE3236D3972D4 |
| 92 | 28 | 2 | 1C6FB87D76DB82FFA1E492166684CACEE560 |
| 93 | 29 | 2 | 524CF9B10D3F1AF51BAF9731980C2CF41D60 |
| 94 | 30 | 2 | 524CF9B10D3F1AF51BAF9731980C2CF41D60 |
| 95 | 31 | 2 | E0503D5DFA4A57704C718920F3245A436624 |
| 96 | 0 | 0 | A32CF584137FDF1D4CCE6A1CF40FEC1F4AE0 |
| 97 | 1 | 1 | EC4D3AC52136FA468F28777078C8A82C0808 |
| 98 | 2 | 2 | 379C84F3A2A3EFEC4B866EB8710D209A54BC |
| 99 | 3 | 3 | 30CABB208C9D6C774814A163765E4ACBC540 |
| 100 | 4 | 4 | 30CABB208C9D6C774814A163765E4ACBC540 |
| 101 | 5 | 5 | 7AED914DFCB6A06858382BC4ABC6625C44D0 |
| 102 | 6 | 6 | CA3448C6716F6F8D15D7372A3A4F6E825A14 |
| 103 | 7 | 7 | 1C7B1FD490936A2B573037CDF699BD50F068 |
| 104 | 8 | 8 | 2D0FC9267E8546393BF113A1AEA2922128C0 |
| 105 | 9 | 9 | ABD1526F4A510F820B689F30C1E7B88C8848 |
| 106 | 10 | 1 | D9F00A909C7B9D92E7EE8477CB50D9456580 |
| 107 | 11 | 2 | 9AA34CA12E72C28DD0E97E5DCC4808C36700 |
| 108 | 12 | 0 | 36D738CD3F9F8D2D3BFB20F6AA32B31540F8 |
| 109 | 13 | 1 | D54203CE6775B80D1963027DA3EB12D7C9D0 |
| 110 | 14 | 2 | 7AC41CAAE627C46C2FCD23D9B7DECB2E2E18 |
| 111 | 15 | 0 | 7AC41CAAE627C46C2FCD23D9B7DECB2E2E18 |
| 112 | 16 | 1 | 94E4E2AE2C4E47FD7D0A154C25BF40F759E0 |
| 113 | 17 | 2 | 43BFFD566D85BE162650670BE1A3CA523284. |

4. The method of claim 1, for a 128 FFT OFDMA transmission mode selecting the preamble codes comprises selecting the pseudo-random codes in the following Table:

| | | | |
|---|---|---|---|
| 0 | 0 | 0 | 01E52A9B3 |
| 1 | 1 | 0 | C96FF8AB1 |
| 2 | 2 | 0 | A1F5CE648 |
| 3 | 3 | 0 | 1E2BF6919 |
| 4 | 4 | 0 | 051798B72 |
| 5 | 5 | 0 | 932D7FA8E |
| 6 | 6 | 0 | 932D7FA8E |
| 7 | 7 | 0 | 2CBD50F73 |
| 8 | 8 | 0 | F86F6A451 |
| 9 | 9 | 0 | 2BA44F7E7 |
| 10 | 10 | 0 | EEFA172C3 |
| 11 | 11 | 0 | FF46C729A |
| 12 | 12 | 0 | 11C1DEA49 |
| 13 | 13 | 0 | E02B1D6D9 |
| 14 | 14 | 0 | 0362D5C61 |
| 15 | 15 | 0 | 27DDC7CA5 |
| 16 | 16 | 0 | 17EAEDAC6 |
| 17 | 17 | 0 | 94ACD9E03 |
| 18 | 18 | 0 | F01472932 |
| 19 | 19 | 0 | D345E8C40 |
| 20 | 20 | 0 | 1A1AC22DD |
| 21 | 21 | 0 | FD5E18DA6 |
| 22 | 22 | 0 | 07116DA91 |
| 23 | 23 | 0 | 35DEB6E0E |
| 24 | 24 | 0 | A0185E326 |
| 25 | 25 | 0 | 93B3F9C75 |
| 26 | 26 | 0 | 0FF3CDCD5 |
| 27 | 27 | 0 | AAD266780 |
| 28 | 28 | 0 | 632481EA8 |
| 29 | 29 | 0 | 9B2D6A380 |
| 30 | 30 | 0 | B5D3C6740 |
| 31 | 31 | 0 | C1DDDF6A5 |
| 32 | 0 | 1 | 8BB8104A5 |
| 33 | 1 | 1 | 64C4215F0 |
| 34 | 2 | 1 | 64C4215F0 |
| 35 | 3 | 1 | 6B7C8AE0C |
| 36 | 4 | 1 | 0CE481A55 |
| 37 | 5 | 1 | AA5B9E7E6 |
| 38 | 6 | 1 | 87C89EF75 |
| 39 | 7 | 1 | 5A83EF8CC |
| 40 | 8 | 1 | 207AA794C |
| 41 | 9 | 1 | FA3A6D7AC |
| 42 | 10 | 1 | 6A4D1C403 |
| 43 | 11 | 1 | 972C3FCEE |
| 44 | 12 | 1 | 44B91C10D |
| 45 | 13 | 1 | 404AD1671 |
| 46 | 14 | 1 | 8039A8B46 |
| 47 | 15 | 1 | 7761B4BD7 |
| 48 | 16 | 1 | 78376108A |
| 49 | 17 | 1 | 31ABBF06D |
| 50 | 18 | 1 | 69C6E455F |
| 51 | 19 | 1 | AB3B3CFF0 |
| 52 | 20 | 1 | 15319240F |
| 53 | 21 | 1 | 731412685 |
| 54 | 22 | 1 | E1A55FF33 |
| 55 | 23 | 1 | 0FF3CDCD5 |
| 56 | 24 | 1 | A3135C034 |
| 57 | 25 | 1 | FC9DB558E |
| 58 | 26 | 1 | FECCB2B85 |
| 59 | 27 | 1 | AA37BDA7C |
| 60 | 28 | 1 | 90955CE1F |
| 61 | 29 | 1 | ADBC1B844 |
| 62 | 30 | 1 | A04A3B197 |
| 63 | 31 | 1 | 015E56CB3 |
| 64 | 0 | 2 | 38E8240AD |
| 65 | 1 | 2 | 382A846DB |
| 66 | 2 | 2 | E4D7DE350 |
| 67 | 3 | 2 | E4D7DE350 |
| 68 | 4 | 2 | ABCF97B09 |
| 69 | 5 | 2 | 249DEABE3 |
| 70 | 6 | 2 | B233CA140 |
| 71 | 7 | 2 | B233CA140 |
| 72 | 8 | 2 | 543C676DB |
| 73 | 9 | 2 | DBE7E42AE |
| 74 | 10 | 2 | DBE7E42AE |
| 75 | 11 | 2 | A7957FC4C |
| 76 | 12 | 2 | 64D6F4038 |
| 77 | 13 | 2 | 4D0F99EF5 |
| 78 | 14 | 2 | D2DD02238 |
| 79 | 15 | 2 | FEA763CB2 |
| 80 | 16 | 2 | 3672D5700 |
| 81 | 17 | 2 | 64D6F4038 |
| 82 | 18 | 2 | 8CE0D5FB6 |
| 83 | 19 | 2 | CC25D7A7E |
| 84 | 20 | 2 | CC25D7A7E |
| 85 | 21 | 2 | CC25D7A7E |
| 86 | 22 | 2 | 1DCEBCBB6 |
| 87 | 23 | 2 | 55B6F39F8 |
| 88 | 24 | 2 | 01ECB468C |
| 89 | 25 | 2 | 6F6C13855 |
| 90 | 26 | 2 | 5DA531038 |
| 91 | 27 | 2 | 7019D3A92 |
| 92 | 28 | 2 | 784CF7EAB |
| 93 | 29 | 2 | 5AAC86FCF |
| 94 | 30 | 2 | E98250DC4 |
| 95 | 31 | 2 | 3F0C9ABBD |
| 96 | 0 | 0 | 57ED9398F |
| 97 | 1 | 1 | C725A2E40 |
| 98 | 2 | 2 | 64F194A80 |
| 99 | 3 | 0 | 575A313E4 |
| 100 | 4 | 1 | E4BEEBD18 |
| 101 | 5 | 2 | 332D6AA0F |
| 102 | 6 | 0 | FBD62ECA6 |
| 103 | 7 | 1 | 38665B015 |
| 104 | 8 | 2 | 07085DAC8 |
| 105 | 9 | 0 | 4CEEB5E1F |
| 106 | 10 | 1 | 9E5CD5B80 |
| 107 | 11 | 2 | B428BA19C |
| 108 | 12 | 0 | 63A76FD05 |
| 109 | 13 | 1 | 517C8460C |
| 110 | 14 | 2 | A1B58A608 |
| 111 | 15 | 0 | 558DA7003 |
| 112 | 16 | 1 | FF64761CA |
| 113 | 17 | 2 | 7DF07735A. |

5. The method of claim 1, for a 1K FFT OFDMA transmission mode selecting the preamble codes comprises selecting the pseudo-random codes in the following Table:

| | | | |
|---|---|---|---|
| 0 | 0 0 | A6F294537B285E1844677D133E4D53CCB1F182DE00489E53E6B6E77065C7EE7D0ADBEAF |
| 1 | 1 0 | 668321CBBE7F462E6C2A07E8BBDA2C7F7946D5F69E35AC8ACF7D64AB4A33C467001F3B2 |
| 2 | 2 0 | 1C75D30B2DF72CEC9117A0BD8EAF8E0502461FC07456AC906ADE03E9B5AB5E1D3F98C6E |
| 3 | 3 0 | 5F9A2E5CA7CC69A5227104FB1CC2262809F3B10D0542B9BDFDA4A73A7046096DF0E8D3D |
| 4 | 4 0 | 82F8A0AB918138D84BB86224F6C342D81BC8BFE791CA9EB54096159D672E91C6E13032F |
| 5 | 5 0 | EE27E59B84CCF15BB1565EF90D478CD2C49EE8A70DE368EED7C9420B0C6FFAF9AF035FC |
| 6 | 6 0 | C1DF5AE28D1CA6A8917BCDAF4E73BD93F931C44F93C3F12F0132FB643EFD5885C8B2BCB |
| 7 | 7 0 | FCA36CCCF7F3E0602696DF745A68DB948C57DFA9575BEA1F05725C42155898F0A63A248 |
| 8 | 8 0 | 024B0718DE6474473A08C8B151AED124798F15D1FFCCD0DE574C5D2C52A42EEF858DBA5 |
| 9 | 9 0 | D4EBFCC3F5A0332BEA5B309ACB04685B8D1BB4CB49F9251461B4ABA255897148F0FF238 |
| 10 | 10 0 | EEA213F429EB926D1BDEC03ABB67D1DE47B4738F3E929854F83D18B216095E6F546DADE |
| 11 | 11 0 | C03036FA9F253045DF6C0889A8B83BAEFCF90EB993C2D79BD911CA84075061AA43DA471 |
| 12 | 12 0 | 1E68EC22E5E2947FB0A29E4CC70597254B36C60331EACF779FE752D3F55DC41ABFC7DC9 |
| 13 | 13 0 | 63A57E75A0434F035AAC4504B4265081D497F10C77928B71797C5D6C6824DC0F23BE34EE |
| 14 | 14 0 | C57C4612816DE981C58FD6F8DE9DD41F2422ADBC522B0CE31F9A6D5F2A126DC08F69FB1 |
| 15 | 15 0 | 978256AF184E7ED17789B33D324C711B36BFBCCE5446EB03687E9A0A839C7CE156104D2 |
| 16 | 16 0 | 011EC823157DD73150640CEB7DDB0A1F8F91E09599A851D5C7CAF687CFB752D297D82FC |
| 17 | 17 0 | C6DE82BEB7F57B9120E8A376D85C8F70FDC65BC660402DAC4AE6002EA2740C4F9E5973C |
| 18 | 18 0 | 4C74929D6F9FAB9E5BB761026038E076F6824295E0AF397806ECEBC6DC713F03ACDC27C |
| 19 | 19 0 | 13E1E85C2234D0F3418001A35F135E10C6C918C36BC659FDA9D655D288A0BDAA8BF489D |
| 20 | 20 0 | FD4AF2D8F4F08F1A7DF59291C9AEE788F641B8231CFB813376E0BEB68DFCFCBBE552445 |
| 21 | 21 0 | EBBC77A493AA0C62C62F25EE5E8D0701F50386F49026FA31487C9FD5C5206CE4EB00576 |
| 22 | 22 0 | 134F936F9E875842587ADCA92187F2FC6D62FFC3A833D8CDE465F9972ABAA83763AAEB7 |
| 23 | 23 0 | 3CD1DA70670BC73363D1B4A66D280FF6AA7636D07ECF32BA26101E5EBA1594FB8A0420A |
| 24 | 24 0 | 918296B2937C2B6F73CF98F85A81B723D1C69DBDF3E019749C582DA22E789562729D475 |
| 25 | 25 0 | C323981B8B2240865F48D61AE1B3B61D88522B7358952F949D4308CA15D1EE8FDFA683F |
| 26 | 26 0 | 7514A6FA5FBB250C5C8CE96F791D676036C344A44B24284477B44CB3E758F8BCD58F05B |
| 27 | 27 0 | 84C7FEC6E977FA1EC0C7CC9E0D067C73D8F846F82ABB3456D2104E1448D5A58D5975152 |
| 28 | 28 0 | 4841AFC277B86A0E067AF319422F501C87ACBFBDD66BFEA3644F879AE98BA8C5D605123 |
| 29 | 29 0 | F35EA87318E459138A2CE69169AD5FD9F30B62DA04ED21320A9F59893F0D176752152FD |
| 30 | 30 0 | A0C5F35C5971CD3DC55D7D2B9FD27AA17A198583F580EB0B800744EE5B6B3648DEA95840 |
| 31 | 31 0 | A6D3D33AD9B56862DBF076E3ACE6A3150510CCC8BE77DE4E6E10EB5FE163765647D07DF |
| 32 | 0 1 | 52849D8F020EA6583032917F36E8B62DFD18AD4D77A7D2D8EC2D4F20CC0C75B7D4DF708 |
| 33 | 1 1 | CC53A152209DEC7E61A06195E3FA633076F7AE1BAFFE83CE565087C0507BA596E0BD990 |
| 34 | 2 1 | 17D98A7E32CCA9B142FE32DB37B2BF726E25AA7A557FFB5C400B47A38B16CF18E1EDE63 |
| 35 | 3 1 | A5BA8C7E2C795C9F84EBBD425992766BDE5549A7A9F7EF7E44AFD941C6084568638FE84 |
| 36 | 4 1 | 33E57E78A5696255CA61AE36027036DA619E493A0A8F95D9915C6E61F3006CB9706BEBA |
| 37 | 5 1 | 09961E7309A9B7F3929C370C51910EBAB1B4F409FA976AE8679F354C84C4051F371F902 |
| 38 | 6 1 | 508A9EBAEF3C7E09CFCFC0B6F444A09B45A130EFC8C5B22BCE87213854E7C9D329C9ADC |
| 39 | 7 1 | AACEEF9BCDC82E4AD525185B07CBABCB74861D16F7C25CFBA917B05463AD65391AF840D |
| 40 | 8 1 | 23060ACC5A125DAB207EEEE47B4EEE1E8466BD17DDA2EB3CD90D2AB7A758C213E6D7FE5 |
| 41 | 9 1 | CA55521667BDA8B6F1B205201A51B3A0C05DE9EA06BC73268730A81A992777021F46055 |
| 42 | 10 1 | 05ADFCA2F8207DC6FF8D1A85A1DD4694D4C48A838C4F833C532710021AC448A7B62B8DD |
| 43 | 11 1 | 218C951223D7B712DC98F8B5217388A830003C5F2A00F232DD3475D2FC78C25B8D88FF9 |
| 44 | 12 1 | 79B94D24D721121EF678B7156F8D2666DE712BBF3837C85A9518781903146A7B4D42A28 |
| 45 | 13 1 | 58AABEF6A6BDE4011CAC583C5104B2C6FC5A2980F856373E5931A3C690245327581FA13 |
| 46 | 14 1 | 427D1AD18E338E16FCE6E23B4AD6D82A2144D53048F2665AA94577AFABD26889FCB1F9F |
| 47 | 15 1 | 337FE0E4C15A22471AE0F6B6F91161A7DE2E1403D73587D5C8355105D2F70642B2CE425 |
| 48 | 16 1 | A3FCAA311B536AC9DB39FED9F4E996506B3181C58D6B7E04157A3FD463F60468765BCFD |
| 49 | 17 1 | F484FD1F57F53A4A749B86148E0B1D0653667CE1393198875DDB0AE9179BBBDAAD53A11 |
| 50 | 18 1 | A3E9ECF1E6048562BC89DB6168E708855F0D4AD29F859EF36C9160DF407D85426233632 |
| 51 | 19 1 | 890519376D1FFAA2894EABCD6663B0A3C2411982C17B01270E0FB0B289D4BC8C3B83DA9 |
| 52 | 20 1 | 09847B6187BB5F6F6728B4ED610088FAD9DADFC00748E9DCD8A0CE320D6C991654ABE05 |
| 53 | 21 1 | 3285AE0A3D196313659C37BE1C94D61D20F11FD49D9FDF9D1026FF5763F02CB78AE135C |
| 54 | 22 1 | 0069D3F34D0D455AFB45FEFDF716333B785C6BDA90DA23F1CC68BC6A1DBC916C595DA3E |
| 55 | 23 1 | AA977A8BCA39381E7C35A1ACC7C4F60421C0862BFD6106C7C025B0676EA0EF68972DD8F |
| 56 | 24 1 | F310745C497094ABE56E0490C0800319DBE290553E696B6859635AF03B121F79D925D19 |
| 57 | 25 1 | 964DFD350B9C7DFDC7F6F7C43283A76F0D613E48A5520D1DAF761C6F47E389B43A023F5 |
| 58 | 26 1 | 6D767B88D28A455CC3B56C942BAFD8E465A50FD2C22FE6162E03A9AAC3C1CC899800610 |
| 59 | 27 1 | C5491C6CA3D998906EC1482F815B74B7C2E3816B682ACC6009AB7EFF34BF0E9CE59C754 |
| 60 | 28 1 | 6D8EE32D30E19D93A0E5AD8226BAE9CF6FCBA17CF6E67FDC5A15A81ECB8908BEDD77C80 |
| 61 | 29 1 | 98F8BFDF774C7A249418E6FF4723D6E6AB2F091CDE4DE1CE11D3BD8463B509FB716940FD |
| 62 | 30 1 | 65300BAD8FFA21BC7DC2C1F79FA97A9F469CCC9E270A61759F34D6276F57CBEB009CD21 |
| 63 | 31 1 | 6F36BB6D5A7DC4FB720439E91FF0DE86DD6C4B93CFC4271F2BCC6169616E3AEAA19E360 |
| 64 | 0 2 | D27B00C70A8AA2C036ADD4E99D047A376B363FEDC287B8FD1A7794818C5873ECD0D3D56 |
| 65 | 1 2 | E7FDDCEED8D31B2C0752D976DE92BEA241A713CF818C274AA1C2E3862C7EB7023AF35D4 |
| 66 | 2 2 | 87BF4954022D30549DF7348477EACB97AC3565B838460CC62F242883313B15C31370335 |
| 67 | 3 2 | 82DD830BEDE4F13C76E4CF9AEF5E42609F0BDDCB000A742B6372DD5225B0C3114494746 |
| 68 | 4 2 | 4E06E4CF46E1F5691938D7F40179D8F79A85216775384BD97966DB4BBF49FB6FAB8F945 |
| 69 | 5 2 | 64164534569A5E670FDB390D09C04802DD6A16B022CADC77EDD7464AFED43C773A8DC76 |
| 70 | 6 2 | FB8769A81AA9DB607F14A6A95948401F83057CDC9C9C3996BA5821403A49F00A4E35191 |
| 71 | 7 2 | 77710D6F40B4F79CC63F678551C3EC18FA9DF2C82E6C8F415DADFD63264B7513180070E |
| 72 | 8 2 | 503F196BBF93C238BFD5E735E5AE52E0DAE64F5E2F4C3B92E553F51303C4A64C4403BF3 |
| 73 | 9 2 | 5FD4A6894566678C95B9D5A59DDE5366799045FEB03A2BAA74094140E9068C61C2E972C |
| 74 | 10 2 | 95B584DC40C8B5DEAD63D48FCE65B1E61BAB4C597D921DB12677141E2FFE7C0AA3DA0D5 |
| 75 | 11 2 | 985763AB6CC8934DB8A0BE738A7AF1D1FA3958C1F9E2D6A51A163E47A0A6E5FEB759FDD |
| 76 | 12 2 | FD8D45F00D943AD986BD353D61C6746DBF8A309B6AE1C173B880D957B76DC031A957E8D |

-continued

| | | | |
|---|---|---|---|
| 77 | 13 | 2 | AE4323534F6EFB1A20169328417885EF304FA220389FA9C2607E5A406F4CE4A7498A39F |
| 78 | 14 | 2 | E5205579893BE184CB9948C28E2F9AAF699D47B6E5E0B219CBEAFE4BEC8D561BD809E34 |
| 79 | 15 | 2 | AB11D6941478D36D5695CE813070DC1E32122A39083E53FE373660AEB125D83383FBDCA |
| 80 | 16 | 2 | 188A09C46F1F11206FF9F15CFB5F6CD2F26C4BF485EE373D650A595064F76CE34C40EAD |
| 81 | 17 | 2 | 4B1CDE25539A56CEDC45FE7F54C38CF155F4FB1AE868F6C3952D07014BF828E810BDE2D |
| 82 | 18 | 2 | 16CA8F8C6A879E865E3611EAC389D56AFA3E4E84CDBB73567BA4A160249C4B680A7D9BC |
| 83 | 19 | 2 | 39D2B08AA0E2E8781476027B41AD72F8D9838B7001AADFD33A92D81E56ECBB2C9378D58 |
| 84 | 20 | 2 | 8C258BC80D4AD125F335A5151EDF9E9A463E06C5C8D046F82E5DC3D73EF4D2231C5D14F |
| 85 | 21 | 2 | 41A029C6356C825585179C5348EDF07A3AC2022539AC28DC4C3C1DFADC8EE9644CD939 |
| 86 | 22 | 2 | 0D70A77CBE9804913BFBEC4FBF917C5CD3580F6062BBAD3F99ECEBB4A9EBB87523AB722 |
| 87 | 23 | 2 | 6A00A30901F9FDE44B4F1ECED44E0BCB943B29519F313BE4496D34F39B154FC2384CB75 |
| 88 | 24 | 2 | 95351107A8BE6ABFC24C1292FE1A0FE677CBFD04F2E81178CAA9D294730EF9C946F676E |
| 89 | 25 | 2 | 01F21470FD9B1E0B7A6D7C0412A15764C277D61BA2EE3B3769DE7ADACB2BB29918FB7 |
| 90 | 26 | 2 | A578ABFE155369440FA3D4DF757CCA596469B80A0E56BFE6010DD63E67CEDB86BB1EF39 |
| 91 | 27 | 2 | 1E1CFFAB031836777DE5D168A9246C559574C74CCC06405EB406B8DDB7C9A6EF54A66A5 |
| 92 | 28 | 2 | 354149C2CA19A735F9CD04AF4922E8ECE6509B978B951F946FD4AD36C7F9C83624205E7 |
| 93 | 29 | 2 | 5A27E60DEA547D0D41897A03199F28A967AC51728E3B38325B4FBECF1B85A7EE9B04182 |
| 94 | 30 | 2 | 784DA3B16B810FE3B851060AD7BD27D9D9457F6C8899A13D311E531B855C15ECE6D3A2F |
| 95 | 31 | 2 | D7DFBC65797633A8C13D3EEC781D48952338136063B579D69437B28B744B5A4BE18AFA9 |
| 96 | 0 | 0 | 61AF26BD39A9FFF52826625E04ADA299385A373FA946D837D754E6CFEBB26F5C03B87CF |
| 97 | 1 | 1 | D77D97CDB93DBEAA65CAFA146F40D72B5E80944F750E07325DC164ED60F32434BC7187D |
| 98 | 2 | 2 | 4529D9CA65AF49C1C39BDC18CFAB87E03FE4DAFC0A48FF1457D46B0DF66B414A23ACDDB |
| 99 | 3 | 0 | 33AC0261DAA57C1D611EBA1C730D50AFEE5BE3E849030A4E891BC8C5F4C78DCDDFEA263 |
| 100 | 4 | 1 | BED48C704F02A84F03BCD299D919DA56F7B71EDF8A0F8A25E8F8496F95A44CE2B9F74C9 |
| 101 | 5 | 2 | 0ECCBE0902EBF4B4C29506014A3706622784B7B2D5153E10AD3112DC5E45277A32E79DE |
| 102 | 6 | 0 | 7CB4937889C7DFD9AA2D37235E06F993D3D4F5D515B39CA652F62397C08457D66BC5A36 |
| 103 | 7 | 1 | 43F23F6CAC6C43896B3EDBF00E1CBD42E2CC75E2A996448F0CF17F6779DD6E356FD11 |
| 104 | 8 | 2 | 72C8A209FBC4A568BEF03BCFE1B0D959F977B0963780B4E54E2B9A1016344ACB7EE3E3A |
| 105 | 9 | 0 | 77AEB9E50DC3727849A94FBFFCDB5B9589AF50ABD8A58808B9663058E17A2EBC496DF43 |
| 106 | 10 | 1 | 667123C89077FE4AAAEF15C635E976C6811682D478FFC7B721A76B5A38697DF4FB7D2CE |
| 107 | 11 | 2 | CBD6C5C9BE55B0BE76AD03392E8A8AB9A86063DB31B79280B447980BB841FD7E9DC6B9B |
| 108 | 12 | 0 | C7D7DEF8B3C9C8667D8D65063B4DAD1FF69445C87CA71DA955D0CA23970E988A6EA4C83 |
| 109 | 13 | 1 | FB246ABD92F9E560CB2BEC2317204C9CE22AD3BD19EA02E90F5F3B7F4F65538D8ED098E |
| 110 | 14 | 2 | 29E74579472FDD8FFC2700B2BF33C649989DD8153093A7CA08B50F7A5E4BAED108A0F0D |
| 111 | 15 | 0 | A27F29D8D6CCD7EB4BBE303C3E9E95802DB98BFD5B8E03B88304359D92E56B7C108CA3C8 |
| 112 | 16 | 1 | 3FE70E26FA00327FE3B2BE6BC5D5014F588F09C17D222C146DD68B4824692A651888C76 |
| 113 | 17 | 2 | 41E91307EC58801CFF2C7E9CFEFBEB71681FAE2BEAEC72D4E4556E99345D3BA4B369B59. |

6. The method of claim 1, for a 512 FFT OFDMA transmission mode selecting the preamble codes comprises selecting the pseudo-random codes in the following Table:

| | | | |
|---|---|---|---|
| 0 | 0 | 0 | 66C9CB4D1C8F31D60F5795886EE02FFF6BE4 |
| 1 | 1 | 0 | D8C30DA58B5ED71056C5D79032B80E05522C |
| 2 | 2 | 0 | 8EB62664E3B2C5222DE18E9000561F25AAFC |
| 3 | 3 | 0 | 3B32299087C257CD31C67E4AA5DD697B0E08 |
| 4 | 4 | 0 | C07E0B0C5DB44071EE6CEC40CA3135CB5DB8 |
| 5 | 5 | 0 | 89B08CD299A8AC757DB59107AF4E1EF1EE1C |
| 6 | 6 | 0 | 1B72E8C0ECFAABF050091382B411B45A718C |
| 7 | 7 | 0 | 5B33ED5A6303397EC3CCC35C8203A5A05178 |
| 8 | 8 | 0 | AD1173C461254BF9181238319F93F86AF964 |
| 9 | 9 | 0 | 51E2005BBA69C858BCC741D84990B657271C |
| 10 | 10 | 0 | 21A03B607DD96F270CBC759B2A9BD6A84A34 |
| 11 | 11 | 0 | 4518EC4C7AD645D24AD949B42A7881403C7C |
| 12 | 12 | 0 | F8B70C595A37315D301D378A4D2848C821D4 |
| 13 | 13 | 0 | FF42582005F8382C5CC6298D757155B36B24 |
| 14 | 14 | 0 | 599EF40107CBB3B30AF945365494A0D60570 |
| 15 | 15 | 0 | C6D6BE87F0D88458ABD22DE822B64E450738 |
| 16 | 16 | 0 | E043896829F236B10A35014D9E4F26ECB95C |
| 17 | 17 | 0 | 2347472A610FC084C71460393AEF36CBE928 |
| 18 | 18 | 0 | 5F4D880DC516DC0B3860DA948225D2BC6770 |
| 19 | 19 | 0 | 9EFEEA99631FAF0D9589E9640BCD56C5FF08 |
| 20 | 20 | 0 | FE792EF83B235B3D4A6447BED27035454BC0 |
| 21 | 21 | 0 | B3B1B868C121C4555A64161B654A4FE81D70 |
| 22 | 22 | 0 | B7C2D44078510ADD2447D93E8A1231AE3910 |
| 23 | 23 | 0 | 16A9D8F71CC1CD0EFA0008AA343A7A4ADA4C |
| 24 | 24 | 0 | 7389FDE96166E7E40F7A6778AA02944937A4 |
| 25 | 25 | 0 | A0598A0907798B3465DD8CBD08565F0FB5B8 |
| 26 | 26 | 0 | 0E75B3C128085C954A25E5808FC5833A8FB0 |
| 27 | 27 | 0 | BBCDA362265B4D4D2BEE80F635E638316280 |
| 28 | 28 | 0 | 660047B06A1B5FAE6A9F0679DBCA9B1A2DF4 |
| 29 | 29 | 0 | 2594AE119CB87E802D67EF7EE0EAE99474CC |
| 30 | 30 | 0 | 8FB3FA462D2CFAF842BB5319D9786A997C10 |
| 31 | 31 | 0 | 599E199B609C0C654DB053E8C94F343AAFF8 |
| 32 | 0 | 1 | E0187D89220D11B5F60DAC078A5E2EED6EF0 |
| 33 | 1 | 1 | 69F57E074F14A10FEC6144C26E98C4688330 |
| 34 | 2 | 1 | D2C4067132528AA41BBE61A9C171A382F768 |
| 35 | 3 | 1 | B027CB82594D3900700B541A99CCD5FD5870 |
| 36 | 4 | 1 | E9B565C61F73EC6633A1F2D96EC409495B80 |
| 37 | 5 | 1 | EBD7E29110582C5951233AB22B03DE709698 |
| 38 | 6 | 1 | 0CCA91DA1B42B0B55C924F32B08B1FAE0E18 |
| 39 | 7 | 1 | A4213FFB85B56E27C74FC6ECBA359875438C |
| 40 | 8 | 1 | 1A37F92589686CFE5E4D4BFD8E2BC63AA8CC |
| 41 | 9 | 1 | 31531C7B2F7518BF59ACFB216FC74D09F2F4 |
| 42 | 10 | 1 | CE026112DF00BB74E1B1F43B595112B16344 |
| 43 | 11 | 1 | 503494DE054AE395883AEDD8CC7801B8F124 |
| 44 | 12 | 1 | 8447E25CA9A0EE1CFB9FADB6C42B8F565B3C |
| 45 | 13 | 1 | 757C45DA8F140FB6E71024294B2439CDACFC |
| 46 | 14 | 1 | F2A59A32B510E505E45E9B5C7C7DBE880DF4 |
| 47 | 15 | 1 | 8DFBF09479BC91E466A539E077D2B26A8B2C |
| 48 | 16 | 1 | 1C6FB87D76DB82FFA1E492166684CACEE560 |
| 49 | 17 | 1 | A32CF584137FDF1D4CCE6A1CF40FEC1F4AE0 |
| 50 | 18 | 1 | EC4D3AC52136FA468F28777078C8A82C0808 |
| 51 | 19 | 1 | 30CABB208C9D6C774814A163765E4ACBC540 |
| 52 | 20 | 1 | CA3448C6716F6F8D15D7372A3A4F6E825A14 |
| 53 | 21 | 1 | ABD1526F4A5F10F820B689F30C1E7B88C8848 |
| 54 | 22 | 1 | 94E4E2AE2C4E47FD7D0A154C25BF40F759E0 |
| 55 | 23 | 1 | 43BFFD566D85BE162650670BE1A3CA523284 |
| 56 | 24 | 1 | D7644475A2A5EDAD1AD184242E3C841A03E0 |
| 57 | 25 | 1 | A61DDBA416D1D14358647C4ACEF2503001E4 |
| 58 | 26 | 1 | 1F9047A8651D4D4A7C582469DC8C41B68E08 |
| 59 | 27 | 1 | E0EAC02D975263F36D4BEF70669CBDEE658C |
| 60 | 28 | 1 | DFAE7334BD2B8FF1D2C7CB5922823B03F744 |
| 61 | 29 | 1 | D44B2AD5842F1EEA1A39DBC64EC064FCCFBC |
| 62 | 30 | 1 | 08AD296C8D17ABD021E02E20DACC247673EC |
| 63 | 31 | 1 | 2FE66830D806B3F8DD38D5FE1CF12DEB9774 |
| 64 | 0 | 2 | C6325F42597BD48A8914944C7DB973D83E64 |
| 65 | 1 | 2 | E04B98E9254434D3F765A621752C0F1FEC54 |
| 66 | 2 | 2 | A74B60D84CCB156B1B8AE015B8CE980868EC |
| 67 | 3 | 2 | 78E7405DCFDA1DFCDA6E54B3794B49A0F8B0 |
| 68 | 4 | 2 | F32F4CA1A154E746FE1C2D1E4A1251779804 |
| 69 | 5 | 2 | 5A2905A1CF5D06444C880ADC07EB3889E71C |
| 70 | 6 | 2 | 74290661C664DEB8829569B7C4E6C32B2BE00 |
| 71 | 7 | 2 | EBB53241F5D9CD87A612C0774ED2FED4679C |
| 72 | 8 | 2 | E33B89ABA4ED020D558B833AF74072922164 |
| 73 | 9 | 2 | 3B7D2DEEF829E230718AA7996CD814A4DD88 |
| 74 | 10 | 2 | 373861E8993FC22E176F6DA6A46A10158EF4 |
| 75 | 11 | 2 | 2BEA329B65DE1CD26ECDD382915AC40B1D0C |
| 76 | 12 | 2 | 7A8B131BD5D1270C30003DA472DD81D9A434 |
| 77 | 13 | 2 | 9D6A237940057479D30BE19AD719F8F9B47C |
| 78 | 14 | 2 | C1FB9C3811B349E9F793A14C8AE8425A6218 |
| 79 | 15 | 2 | DFFDE03D8C717A346B4B1D3C02693330A9B4 |

| | | | |
|---|---|---|---|
| 80 | 16 | 2 | 76254DEF89683CD7210898069E2CDA0EE144 |
| 81 | 17 | 2 | 09B9B69C132C4E2DC16A1438828147D65F94 |
| 82 | 18 | 2 | B1CCE0D47DF246E9059CBC970168518206AC |
| 83 | 19 | 2 | 1017669D7990F3AB4378924C69E442F2BAD0 |
| 84 | 20 | 2 | 772407B19C5FA41D542C8A2DC9ADD2C2943C |
| 85 | 21 | 2 | 7A38C2889EB10D93F23EC75B212D327D18A8 |
| 86 | 22 | 2 | D25A195D899BF6F531F5ECC228BE0678A438 |
| 87 | 23 | 2 | A83FD1C33F4C6CAA5A0E8B062937AC310034 |
| 88 | 24 | 2 | AA6DDD1A05ADF49F615BE9F9EBCA6630E440 |
| 89 | 25 | 2 | B14990574937763EEBD71A12FEB0C673F878 |
| 90 | 26 | 2 | DDF013D74BDDE5FBB621A32B54DE24AA1D60 |
| 91 | 27 | 2 | D814295D387D2EE33F90C07CA493062B3054 |
| 92 | 28 | 2 | 89B93046231A786C3D74ABAEC6AFF42D037C |
| 93 | 29 | 2 | 5680E918BA19199E841B4D6A7D1DD1420E78 |
| 94 | 30 | 2 | 639CC821373B332F975817C0A1AC16A48150 |
| 95 | 31 | 2 | 06711D78BD8978D82DA58B7E494DDF77E994 |
| 96 | 0 | 0 | C882DD8DBD23C796A1389DA4EAA9A4138640 |
| 97 | 1 | 1 | 038086D70895496BCABC404B1EC999F67AC0 |
| 98 | 2 | 2 | 8203073A335DB9E57B0CA2F07D5958176B50 |
| 99 | 3 | 0 | 3FF1CD3638EE6469A4A482AF834EF56A2340 |
| 100 | 4 | 1 | 69EA7871159D5099F900C6133C07DABF56F0 |
| 101 | 5 | 2 | 4D88ABB17FF855393EDBC070CF0439D5E94C |
| 102 | 6 | 0 | 01EFD43C87362B00E376A728BC597BEED978 |
| 103 | 7 | 1 | 7AE20D16F3CC6F947413518FDF6E1FCCCDE8 |
| 104 | 8 | 2 | BB852F9A90B0DE260BB67F45491B31DE3A74 |
| 105 | 9 | 0 | 088627544BDF971C1AC4F86F05A212EE9634 |
| 106 | 10 | 1 | 0C8A08A37C2B9D3C1812E9C116B4E6A6285C |
| 107 | 11 | 2 | E74775CADDDDF0D2D808FE7FC1C177489284 |
| 108 | 12 | 0 | E81ECC6AC393294E9B549A8B2BADE7FFF904 |
| 109 | 13 | 1 | 1C5FAE8CACE7A2CD13CAF4A34A440E909BF8 |
| 110 | 14 | 2 | 6EE7E42A292BDACC5C79B81CA6598274C940 |
| 111 | 15 | 0 | 407547BC0C961D9E9ADDE010F4990724E8DC |
| 112 | 16 | 1 | 46CE626ACD894F9650E6B7C3F9E3BFAE5B08 |
| 113 | 17 | 2 | C59B894FBF170F44F4816750280AB8CB4E48. |

7. The method of claim 1, for a 128 FFT OFDMA transmission mode selecting the preamble codes comprises selecting the pseudo-random codes in the following Table:

| | | | |
|---|---|---|---|
| 0 | 0 | 0 | 01E52A9B3 |
| 1 | 1 | 0 | C96FF8AB1 |
| 2 | 2 | 0 | A1F5CE648 |
| 3 | 3 | 0 | 1E2BF6919 |
| 4 | 4 | 0 | 051798B72 |
| 5 | 5 | 0 | 932D7FA8E |
| 6 | 6 | 0 | 2CBD50F73 |
| 7 | 7 | 0 | F86F6A451 |
| 8 | 8 | 0 | 2BA44F7E7 |
| 9 | 9 | 0 | EEFA172C3 |
| 10 | 10 | 0 | FF46C729A |
| 11 | 11 | 0 | 0362D5C61 |
| 12 | 12 | 0 | 27DDC7CA5 |
| 13 | 13 | 0 | 17EAEDAC6 |
| 14 | 14 | 0 | 94ACD9E03 |
| 15 | 15 | 0 | 1A1AC22DD |
| 16 | 16 | 0 | FD5E18DA6 |
| 17 | 17 | 0 | 35DEB6E0E |
| 18 | 18 | 0 | A0185E326 |
| 19 | 19 | 0 | 93B3F9C75 |
| 20 | 20 | 0 | 632481EA8 |
| 21 | 21 | 0 | 8BB8104A5 |
| 22 | 22 | 0 | 87C89EF75 |
| 23 | 23 | 0 | 207AA794C |
| 24 | 24 | 0 | 6A4D1C403 |
| 25 | 25 | 0 | 7761B4BD7 |
| 26 | 26 | 0 | 31ABBF06D |
| 27 | 27 | 0 | 69C6E455F |
| 28 | 28 | 0 | AB3B3CFF0 |
| 29 | 29 | 0 | 731412685 |
| 30 | 30 | 0 | A3135C034 |
| 31 | 31 | 0 | FECCB2B85 |
| 32 | 0 | 1 | AA37BDA7C |
| 33 | 1 | 1 | 90955CE1F |
| 34 | 2 | 1 | ADBC1B844 |
| 35 | 3 | 1 | A04A3B197 |
| 36 | 4 | 1 | 015E56CB3 |
| 37 | 5 | 1 | 64D6F4038 |
| 38 | 6 | 1 | D2DD02238 |
| 39 | 7 | 1 | FEA763CB2 |
| 40 | 8 | 1 | 8CE0D5FB6 |
| 41 | 9 | 1 | CC25D7A7E |
| 42 | 10 | 1 | 7019D3A92 |
| 43 | 11 | 1 | 784CF7EAB |
| 44 | 12 | 1 | 07085DAC8 |
| 45 | 13 | 1 | 4CEEB5E1F |
| 46 | 14 | 1 | 9E5CD5B80 |
| 47 | 15 | 1 | 63A76FD05 |
| 48 | 16 | 1 | AA276F96F |
| 49 | 17 | 1 | 3370F5082 |
| 50 | 18 | 1 | 35A644170 |
| 51 | 19 | 1 | 16FD73B8B |
| 52 | 20 | 1 | EEE990E94 |
| 53 | 21 | 1 | 28A3120FC |
| 54 | 22 | 1 | C2FBC2993 |
| 55 | 23 | 1 | 880BCACD3 |
| 56 | 24 | 1 | AFA4DB918 |
| 57 | 25 | 1 | AE1E49884 |
| 58 | 26 | 1 | F7945E264 |
| 59 | 27 | 1 | 38374CA42 |
| 60 | 28 | 1 | 5AAE39B00 |
| 61 | 29 | 1 | 138069E54 |
| 62 | 30 | 1 | 966707005 |
| 63 | 31 | 1 | A5037759E |
| 64 | 0 | 2 | 3FE158D96 |
| 65 | 1 | 2 | AED3B839F |
| 66 | 2 | 2 | F5AE23268 |
| 67 | 3 | 2 | 1895E68BE |
| 68 | 4 | 2 | 1443C94EC |
| 69 | 5 | 2 | 929547307 |
| 70 | 6 | 2 | A17D3230C |
| 71 | 7 | 2 | D54FC0C33 |
| 72 | 8 | 2 | AB77F079C |
| 73 | 9 | 2 | C3CA00A66 |
| 74 | 10 | 2 | 025519879 |
| 75 | 11 | 2 | 6CF39F815 |
| 76 | 12 | 2 | F69E451B1 |
| 77 | 13 | 2 | 91BC72EBF |
| 78 | 14 | 2 | F964A5447 |
| 79 | 15 | 2 | F8CD36F4A |
| 80 | 16 | 2 | 726A3C802 |
| 81 | 17 | 2 | 118D1B682 |
| 82 | 18 | 2 | DED9E703A |
| 83 | 19 | 2 | 3E8929773 |
| 84 | 20 | 2 | 2C64AA7F9 |
| 85 | 21 | 2 | 2249CEA0F |
| 86 | 22 | 2 | 01363A94E |
| 87 | 23 | 2 | 69D77721F |
| 88 | 24 | 2 | AE103C9B9 |
| 89 | 25 | 2 | 89E2A6940 |
| 90 | 26 | 2 | A7BC42645 |
| 91 | 27 | 2 | BBB6B9C0F |
| 92 | 28 | 2 | 5BF7598F8 |
| 93 | 29 | 2 | 4AE4C79FE |
| 94 | 30 | 2 | 1FDC748C9 |
| 95 | 31 | 2 | 877D5E6E4 |
| 96 | 0 | 0 | 0FE322452 |
| 97 | 1 | 1 | 4DC778B5F |
| 98 | 2 | 2 | ADD9E3F88 |
| 99 | 3 | 0 | 2C1C857DC |
| 100 | 4 | 1 | CFB4B5503 |
| 101 | 5 | 2 | CD8505E21 |
| 102 | 6 | 0 | 82892F4CE |
| 103 | 7 | 1 | 3979FD176 |
| 104 | 8 | 2 | 5FA49C311 |
| 105 | 9 | 0 | BA7857B19 |
| 106 | 10 | 1 | BC030C4CA |
| 107 | 11 | 2 | 517F3CBD6 |
| 108 | 12 | 0 | 7E545BE73 |
| 109 | 13 | 1 | DDCA69C3F |
| 110 | 14 | 2 | A01A2C8C7 |
| 111 | 15 | 0 | 1C0B64435 |
| 112 | 16 | 1 | 330282DF2 |
| 113 | 17 | 2 | 147FCCF4B. |

8. The method of claim 1, wherein transmitting the modulated pilots comprises transmitting in a cellular system.

9. A method of transmitting data with a preamble code usable in Orthogonal Frequency Division Multiple Access (OFDMA) for the physical layer (PHY), comprising:
selecting preamble codes suitable for 1024, 512 or 128 FFT OFDMA transmission mode by generating various pseudo-random codes, evaluating the codes for crest factor, PAPR and cross-correlation and selecting the highest performance codes;
generating, by a communication system, pilots for the OFDMA transmission mode;
modulating the pilots with the selected preamble codes, by the communication system; and
transmitting the modulated pilots over an OFDMA channel, by the communication system.

* * * * *